US012647386B2

(12) United States Patent
Pawar et al.

(10) Patent No.: US 12,647,386 B2
(45) Date of Patent: Jun. 2, 2026

(54) NETWORK ADDRESS MIGRATION BETWEEN DIFFERENT NETWORKS BY UPDATING NETWORK CONFIGURATION USING A DESTINATION COMPUTE INSTANCE IN A CLOUD ENVIRONMENT TO REDUCE DISRUPTIONS

(71) Applicant: NetApp, Inc., San Jose, CA (US)

(72) Inventors: Sangramsinh Pandurang Pawar, Bedford, MA (US); John David McA'Nulty, Westford, MA (US); Michael Joseph Beattie, Pittsburgh, PA (US); Chatree Sangpachatanaruk, Wexford, PA (US)

(73) Assignee: NETAPP, INC., San Jose, CA (US)

( * ) Notice: Subject to any disclaimer, the term of this patent is extended or adjusted under 35 U.S.C. 154(b) by 107 days.

(21) Appl. No.: 18/617,071

(22) Filed: Mar. 26, 2024

(65) Prior Publication Data

US 2025/0310294 A1 Oct. 2, 2025

(51) Int. Cl.
*H04L 61/2539* (2022.01)
*H04L 67/10* (2022.01)
*H04L 101/618* (2022.01)

(52) U.S. Cl.
CPC .......... *H04L 61/2539* (2013.01); *H04L 67/10* (2013.01); *H04L 2101/618* (2022.05)

(58) Field of Classification Search
CPC ............................ H04L 61/2539; H04L 67/10
See application file for complete search history.

(56) References Cited

U.S. PATENT DOCUMENTS

| | | | |
|---|---|---|---|
| 9,992,058 B2 * | 6/2018 | Olson ..................... | H04L 69/40 |
| 12,158,819 B2 * | 12/2024 | Sharma ............... | G06F 11/2023 |
| 2014/0229606 A1 | 8/2014 | Griswold et al. | |
| 2020/0127937 A1 | 4/2020 | Busick et al. | |
| 2025/0132974 A1 * | 4/2025 | Zhu ..................... | H04L 41/0668 |
| 2025/0310293 A1 | 10/2025 | Pawar et al. | |

OTHER PUBLICATIONS

Final Office Action mailed on Nov. 25, 2025 for U.S. Appl. No. 18/617,090, filed Mar. 26, 2024, 13 pages.
Non Final Office Action mailed on Jul. 31, 2025 for U.S. Appl. No. 18/617,090, filed Mar. 26, 2024, 10 pages.

* cited by examiner

*Primary Examiner* — Nazia Naoreen
(74) *Attorney, Agent, or Firm* — JAFFERY WATSON HAMILTON & DESANCTIS LLP

(57) ABSTRACT

Network address migration using a destination compute instance to update network configuration information in a cloud environment is disclosed. A network interface either using a private address within a subnet corresponding to the created network interface or using a floating address outside of the subnet corresponding to the created network interface is created. A first node of the HA pair with a service provider interface. The first node is an active data server of the HA pair, and the second node is a backup node of the HA pair. Requests are serviced the first node using the created network interface. Upon failure of the first node, the second node performs a failover, wherein if the first node was utilizing a floating address, the second node registers the second node with the service provider interface by adding an address of the second node to the route table.

20 Claims, 12 Drawing Sheets

CREATE A NETWORK INTERFACE EITHER USING A STATIC PRIVATE INTERNAL IP ADDRESS WITHIN A SUBNET CORRESPONDING TO THE CREATED NETWORK INTERFACE OR USING A FLOATING PRIVATE INTERNAL IP ADDRESS OUTSIDE OF THE SUBNET CORRESPONDING TO THE CREATED NETWORK INTERFACE 600

REGISTER A FIRST NODE OF THE HA PAIR WITH A SERVICE PROVIDER INTERFACE, THE FIRST NODE TO BE AN ACTIVE DATA SERVER OF THE HA PAIR AND A SECOND NODE OF THE HA PAIR TO BE A BACKUP NODE OF THE HA PAIR, WHERE REGISTERING THE FIRST NODE OF THE HA PAIR INCLUDES UTILIZING EITHER THE STATIC PRIVATE INTERNAL IP ADDRESS OR THE FLOATING PRIVATE INTERNAL IP ADDRESS, AND REGISTRATION COMPRISES AT LEAST ADDING THE FLOATING PRIVATE IP ADDRESS OF THE FIRST NODE TO AT LEAST ONE ROUTE TABLE IF THE CREATED NETWORK INTERFACE UTILIZES THE FLOATING PRIVATE INTERNAL IP ADDRESS 602

SERVICING REQUESTS RECEIVED BY THE FIRST NODE OF THE HA PAIR BY ACCESSING THE SERVICE PROVIDER INTERFACE USING THE CREATED NETWORK INTERFACE 604

DETECT A FAILURE OF THE FIRST NODE OF THE HA PAIR 606

DETERMINE, WITH THE SECOND NODE OF THE HA PAIR, WHETHER THE CREATED NETWORK INTERFACE UTILIZES THE STATIC PRIVATE INTERNAL IP ADDRESS OR THE FLOATING PRIVATE INTERNAL IP ADDRESS 608

PERFORM A FAILOVER OPERATION UNDER CONTROL OF THE SECOND NODE OF THE HA PAIR IN RESPONSE TO THE FAILURE OF THE FIRST NODE, WHERE IF THE FIRST NODE WAS UTILIZING A FLOATING PRIVATE INTERNAL IP ADDRESS, THE SECOND NODE REGISTERS THE SECOND NODE OF THE HA PAIR WITH THE SERVICE PROVIDER INTERFACE BY AT LEAST ADDING A FLOATING PRIVATE INTERNAL IP ADDRESS OF THE SECOND NODE TO THE AT LEAST ONE ROUTE TABLE 610

SERVICING REQUESTS RECEIVED BY THE SECOND NODE OF THE HA PAIR AFTER PERFORMING THE FAILOVER OPERATION UNDER THE CONTROL OF THE SECOND NODE OF THE HA PAIR 612

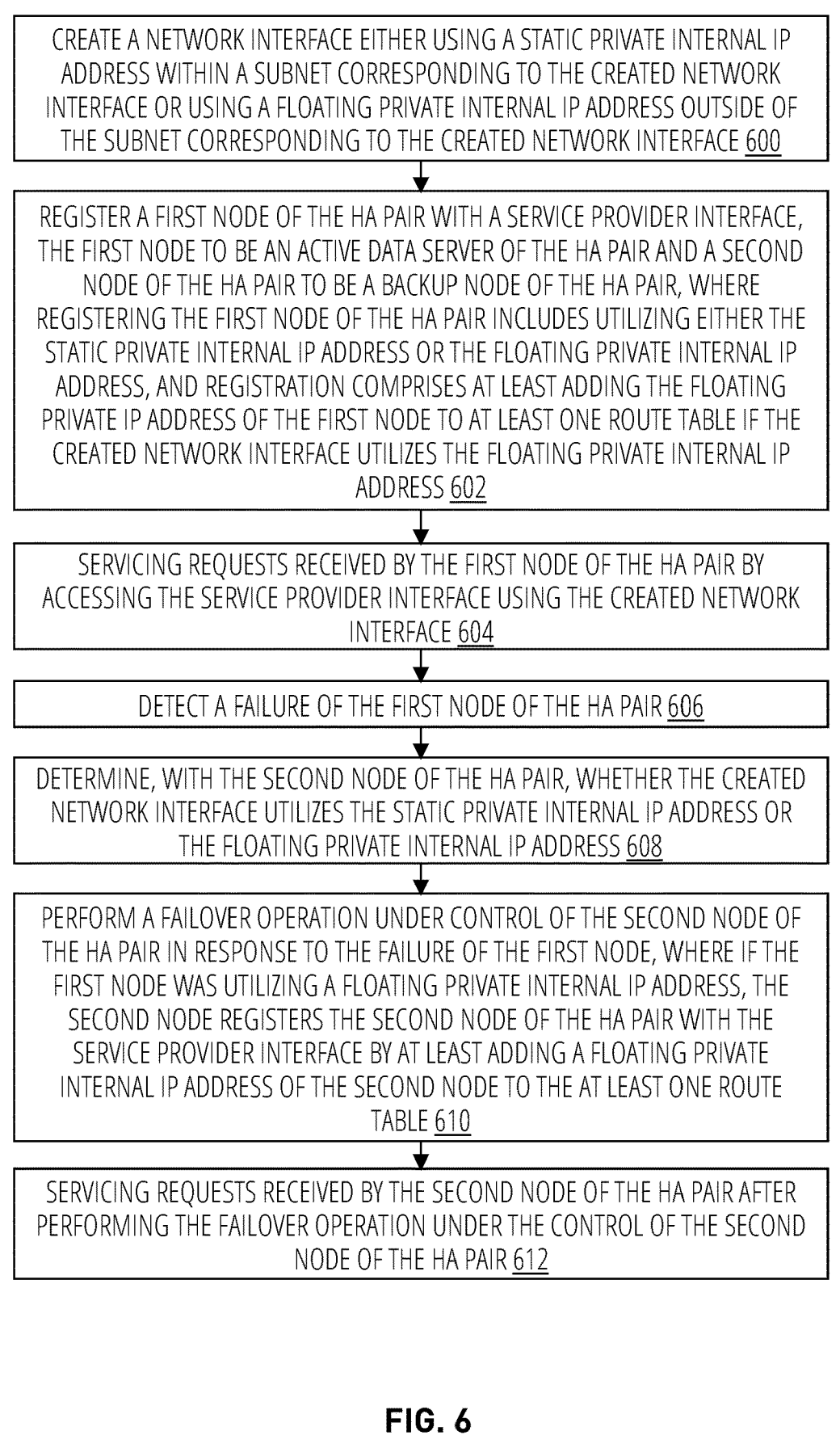

CREATE A NETWORK INTERFACE EITHER USING A STATIC PRIVATE INTERNAL IP ADDRESS WITHIN A SUBNET CORRESPONDING TO THE CREATED NETWORK INTERFACE OR USING A FLOATING PRIVATE INTERNAL IP ADDRESS OUTSIDE OF THE SUBNET CORRESPONDING TO THE CREATED NETWORK INTERFACE 600

REGISTER A FIRST NODE OF THE HA PAIR WITH A SERVICE PROVIDER INTERFACE, THE FIRST NODE TO BE AN ACTIVE DATA SERVER OF THE HA PAIR AND A SECOND NODE OF THE HA PAIR TO BE A BACKUP NODE OF THE HA PAIR, WHERE REGISTERING THE FIRST NODE OF THE HA PAIR INCLUDES UTILIZING EITHER THE STATIC PRIVATE INTERNAL IP ADDRESS OR THE FLOATING PRIVATE INTERNAL IP ADDRESS, AND REGISTRATION COMPRISES AT LEAST ADDING THE FLOATING PRIVATE IP ADDRESS OF THE FIRST NODE TO AT LEAST ONE ROUTE TABLE IF THE CREATED NETWORK INTERFACE UTILIZES THE FLOATING PRIVATE INTERNAL IP ADDRESS 602

SERVICING REQUESTS RECEIVED BY THE FIRST NODE OF THE HA PAIR BY ACCESSING THE SERVICE PROVIDER INTERFACE USING THE CREATED NETWORK INTERFACE 604

DETECT A FAILURE OF THE FIRST NODE OF THE HA PAIR 606

DETERMINE, WITH THE SECOND NODE OF THE HA PAIR, WHETHER THE CREATED NETWORK INTERFACE UTILIZES THE STATIC PRIVATE INTERNAL IP ADDRESS OR THE FLOATING PRIVATE INTERNAL IP ADDRESS 608

PERFORM A FAILOVER OPERATION UNDER CONTROL OF THE SECOND NODE OF THE HA PAIR IN RESPONSE TO THE FAILURE OF THE FIRST NODE, WHERE IF THE FIRST NODE WAS UTILIZING A FLOATING PRIVATE INTERNAL IP ADDRESS, THE SECOND NODE REGISTERS THE SECOND NODE OF THE HA PAIR WITH THE SERVICE PROVIDER INTERFACE BY AT LEAST ADDING A FLOATING PRIVATE INTERNAL IP ADDRESS OF THE SECOND NODE TO THE AT LEAST ONE ROUTE TABLE 610

SERVICING REQUESTS RECEIVED BY THE SECOND NODE OF THE HA PAIR AFTER PERFORMING THE FAILOVER OPERATION UNDER THE CONTROL OF THE SECOND NODE OF THE HA PAIR 612

FIG. 6

NETWORK ADDRESS MIGRATION BETWEEN DIFFERENT NETWORKS BY UPDATING NETWORK CONFIGURATION USING A DESTINATION COMPUTE INSTANCE IN A CLOUD ENVIRONMENT TO REDUCE DISRUPTIONS

BACKGROUND

Multiple storage nodes can provide a distributed storage architecture configured to service requests issued by one or more client devices. The storage requests are directed to data on storage devices coupled to one or more storage nodes. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume. Managing data traffic on the storage devices can be a complex task that, if done inefficiently, can result in unnecessary latencies and other undesirable results, including possibly loss of critical data.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 6 illustrates an example flow diagram corresponding to an approach for destination address migration.

DETAILED DESCRIPTION

In the following description, for the purposes of explanation, numerous specific details are outlined in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

To address the need for constant data availability, various architectures described herein can be configured to support high availability (HA) computing functionality. HA for a storage system can be described according to two performance characteristics: the availability of data from storage devices, and responsiveness to requests to access data on the storage devices. Failure with respect to either of these HA characteristics can be considered a data-availability failure. In response to these failures, the HA computing environment provides sufficient resiliency and recoverability to support the desired HA characteristics. The following description is generally presented in the context of HA pairs having a primary/active node and a secondary/backup node. However, the concepts described herein equally apply to more complex HA configurations such as three-node configurations, four-node configurations, eight-node configurations, etc.

Figure 1:
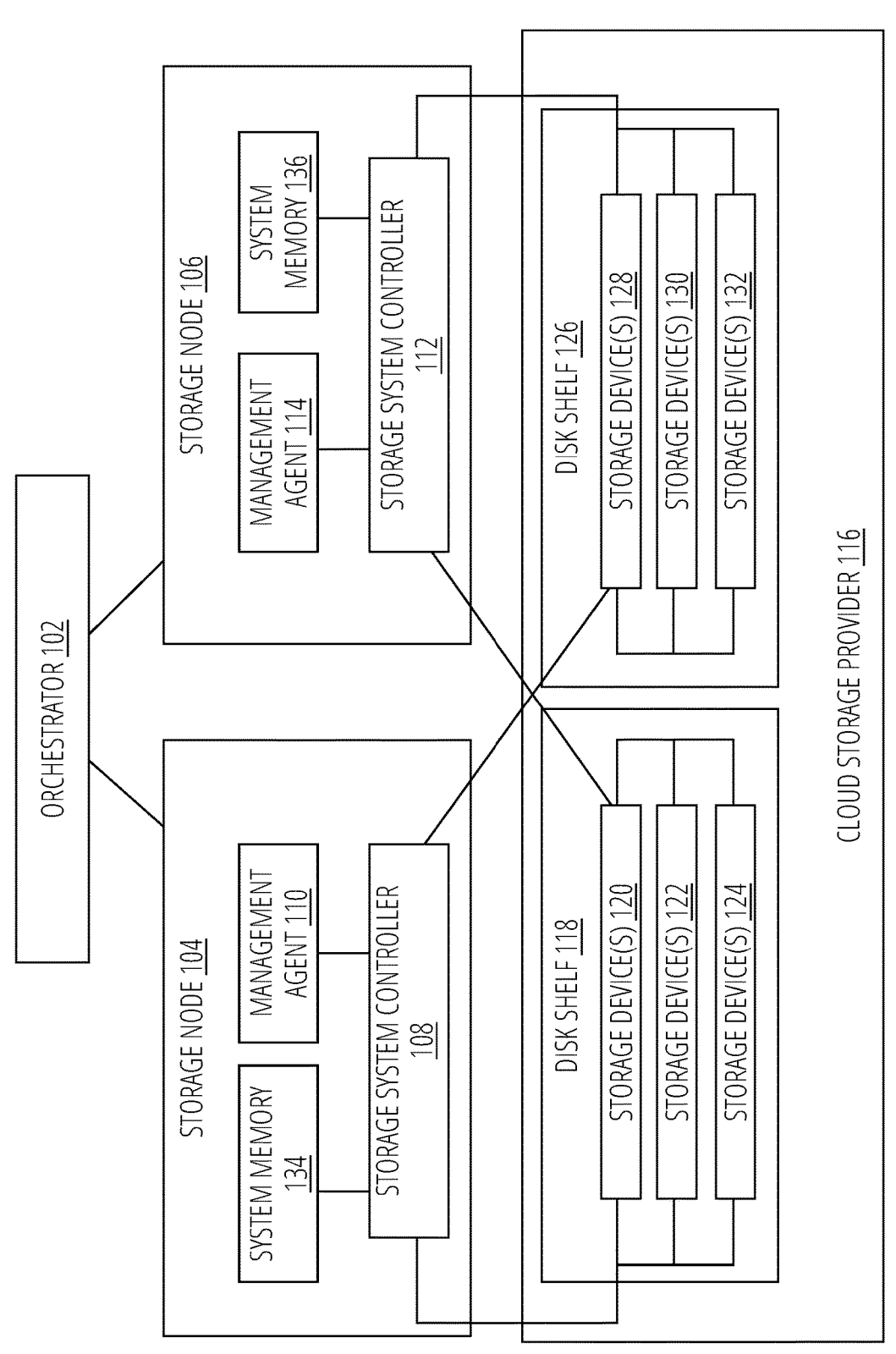
FIG. 1 is a block diagram of an example high availability (HA) computing environment having an HA pair.

FIG. 1 is a block diagram of an example high availability (HA) computing environment having an HA pair. In the example of FIG. 1, storage node 104 and storage node 106 can be located within the same location (e.g., same data center), or storage node 104 can be located in different locations (e.g., different data centers). Any number of HA nodes can be supported utilizing the traffic management approaches described herein.

As discussed above, HA infrastructures are used for mission-critical environments where computing resources are required to continue functioning when one or more components fail. HA infrastructures provide resource redundancy so that components critical to continued operation have a corresponding redundant component that can be used in case of failure. HA infrastructures also provide monitoring, including, for example, data collection from various systems determining when a component is failing or has failed. HA infrastructures further provide failover capabilities to switch from a failing or failed component to the corresponding redundant component. Some or all of the functionality to support HA operation can be provided by one or more components or layers of ONTAP software available from NetApp, Inc. of San Jose, CA, which can be implemented in (or executed by) one or more components of the HA nodes (e.g., storage system controller 108 and/or management agent 110 in storage node 104, storage system controller 112 and/or management agent 114 in storage node 106). Other storage management system architectures can also be supported.

The example illustrated in FIG. 1 is that of a single HA pair; however, any number of HA pairs can be supported using the approaches and architectures described. The example HA pair configuration includes two nodes (e.g., storage node 104, storage node 106) that provide a pair of matching storage system controllers (e.g., storage system controller 108, storage system controller 112). Each storage system controller has a corresponding disk shelf. For example, storage system controller 108 is coupled with disk shelf 118 that includes storage device(s) 120, storage device(s) 122 and storage device(s) 124. Similarly, storage system controller 112 is coupled with disk shelf 126 that includes storage device(s) 128, storage device(s) 130 and storage device(s) 132. In general, a disk shelf can include any number of physical devices that can be of various device types (e.g., hard disk drive (HDD), solid-state drive (SSD), hybrid).

Each storage system controller is further connected to the disk shelves of the other storage system controller. In the example of FIG. 1, storage system controller 108 is coupled with storage device(s) 128, storage device(s) 130, and storage device(s) 132 of disk shelf 126. Similarly, storage system controller 112 is coupled with storage device(s) 120, storage device(s) 122, and storage device(s) 124 of disk shelf 118. Storage system controller 108 and storage system controller 112 can be controlled by management agents (e.g., management agent 110, management agent 114) that can provide or support the functionality of, for example, ONTAP software, as mentioned above. In the example of FIG. 1, storage system controller 108 is controlled by management agent 110, and storage system controller 112 is controlled by management agent 114. Alternatively, other storage system controller management software can be supported.

Management agent 110 controls the operation of storage system controller 108 with respect to the data storage resources of storage node 104, which, in the example of FIG. 1, includes disk shelf 118 and system memory 134. Management agent 110 also monitors the availability status of storage node 106. System memory 134 provides memory for operations within storage node 104.

Management agent 114 controls the operation of storage system controller 112 with respect to the data storage resources of storage node 106, which in the example of FIG. 1, include disk shelf 126, and system memory 136. Management agent 114 also monitors the availability status of storage node 104. System memory 136 provides memory for operations within storage node 106.

As described below, cloud storage provider 116 utilizes a set of application program interfaces (APIs) to interface with storage nodes. In practice, each cloud storage provider 116 (e.g., Amazon, Microsoft) can have a very different set of APIs such that approaches utilized by storage nodes interacting with a first cloud storage provider may not be able to interact with a second cloud storage provider.

Thus, in a failover situation, the specifics of cloud storage provider 116 APIs must be understood by the nodes of the HA pairs, and when the failover process is managed by the second/backup node, that node interacts utilizing the APIs of cloud storage provider 116. Specific example approaches and message flows are described in detail below.

Figure 2:
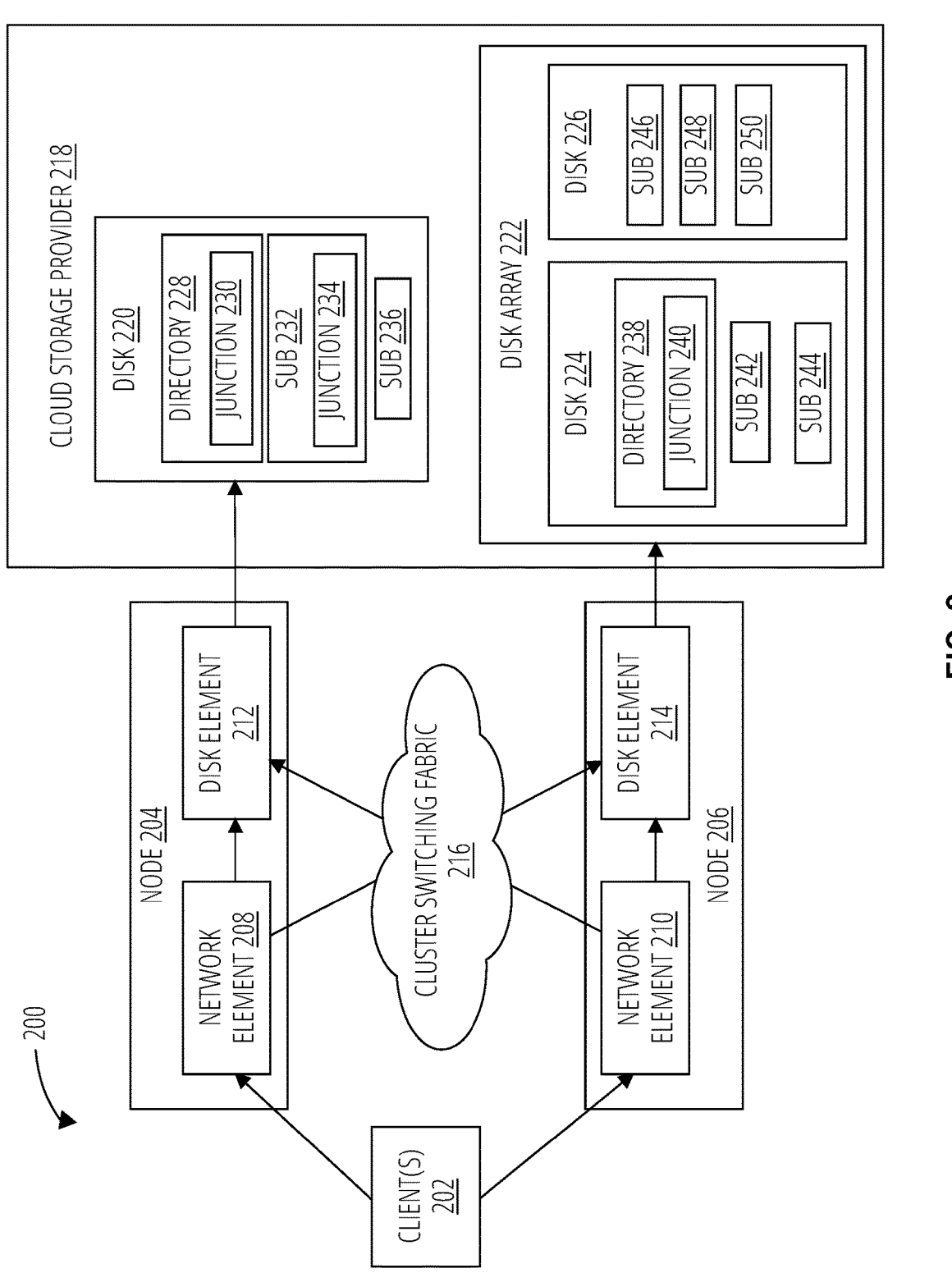
FIG. 2 illustrates one embodiment of block diagram of a plurality of nodes interconnected as a cluster.

FIG. 2 illustrates one embodiment of a block diagram of a plurality of nodes interconnected as a cluster. The cluster of nodes illustrated in FIG. 2 can be configured to provide storage services relating to information organization on storage devices. In an example, node 204 and 206 form a HA pair that interacts with cloud storage provider 218 via one or more APIs.

The nodes of FIG. 2 (e.g., node 204, node 206) include various functional components that cooperate to provide a distributed storage system architecture of cluster 200. To that end, each node is generally organized as a network element (e.g., network element 208 in node 204, network element 210 in node 206) and a disk element (e.g., disk element 212 in node 204, disk element 214 in node 206). The network elements provide functionality that enables the nodes to connect to client(s) 202 over one or more network connections, while each disk element connects to one or more storage devices (e.g., disk 220, disk array 222). In an example, disk 220 and/or disk array 222 can be provided by cloud storage provider 218.

In the example of FIG. 2, disk element 212 connects to disk 220 and disk element 214 connection to 222 (which includes disk 224 and 226). Node 204 and node 206 are interconnected by cluster switching fabric 216 which, in an example, may be a Gigabit Ethernet switch. It should be noted that while there is shown an equal number of network and disk elements in cluster 200, there may be differing numbers of network and/or disk elements. For example, a plurality of network elements and/or disk elements may be interconnected in a cluster configuration that does not reflect a one-to-one correspondence between the network and disk elements. As such, the description of a node comprising one network element and one disk element should be taken as illustrative only.

Client(s) 202 may be general-purpose computers configured to interact with node 204 and node 206 in accordance with a client/server model of information delivery. That is, each client may request the services of a node, and the corresponding node may return the results of the services requested by the client by exchanging packets over one or more network connections.

Client(s) 202 may issue packets, including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP) when accessing information in the form of blocks.

Disk elements (e.g., disk element 212, disk element 214) are illustratively connected to disks that may be individual disks (e.g., disk 220) or organized into disk arrays (e.g., disk array 222). Alternatively, storage devices other than disks may be utilized, e.g., flash memory, optical storage, solid-state devices, etc. As such, the description of disks should be taken as exemplary only. A file system may implement a plurality of flexible volumes on the disks. Flexible volumes may comprise a plurality of directories (e.g., directory 228, directory 238) and a plurality of subdirectories (e.g., sub 232, sub 242, sub 246, sub 248, sub 250). Junctions (e.g., junction 230, junction 234, junction 240) may be located in directories and/or subdirectories. It should be noted that the distribution of directories, subdirectories, and junctions shown in FIG. 2 is for illustrative purposes. As such, the description of the directory structure relating to subdirectories and/or junctions should be taken as exemplary only.

Figure 3:
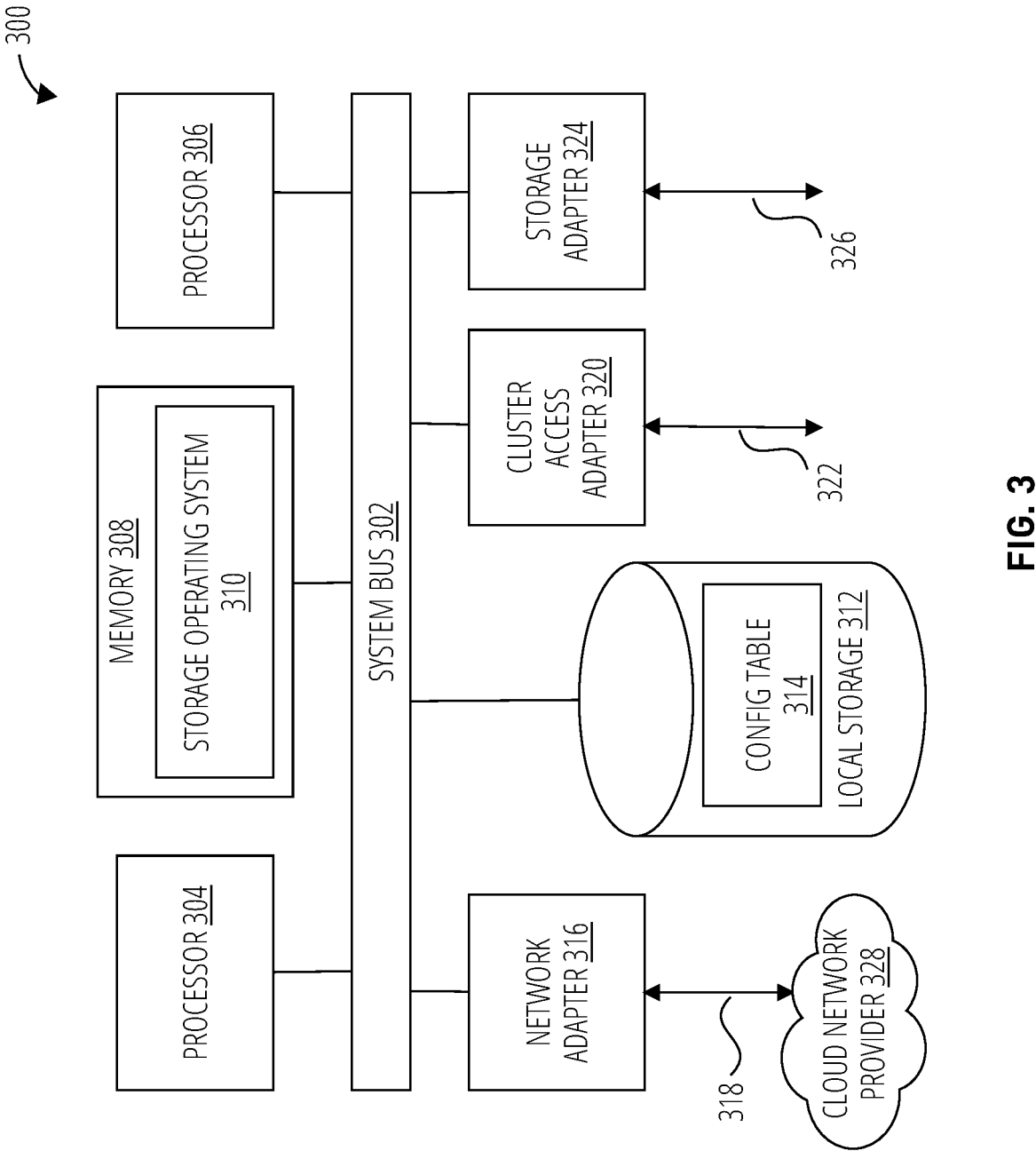
FIG. 3 illustrates one embodiment of a block diagram of a node.

FIG. 3 illustrates one embodiment of a block diagram of a node. Node 300 can be, for example, node 204 or node 206, as discussed in FIG. 2. The nodes illustrated in FIG. 3 part of a HA pair that utilizes the failover approaches described herein.

In the example of FIG. 3, node 300 includes processor 304 and processor 306, memory 308, network adapter 316, cluster access adapter 320, storage adapter 324 and local storage 312 interconnected by 202. In an example, local storage 312 can be one or more storage devices, such as disks, utilized by the node to locally store configuration information (e.g., in config table 314).

Cluster access adapter 320 provides a plurality of ports adapted to couple node 300 to other nodes (not illustrated in FIG. 3) of a cluster (e.g., to form an HA pair). In an example, Ethernet is used as the clustering protocol and interconnect media, although it will be apparent to those skilled in the art that other types of protocols and interconnects may be utilized within the cluster architecture described herein.

Alternatively, where the network elements and disk elements are implemented on separate storage systems or computers, cluster access adapter 320 is utilized by the network element (e.g., network element 208, network element 210) and disk element (e.g., disk element 212, disk element 214) for communicating with other network elements and disk elements in the cluster.

In the example of FIG. 3 node 300 is illustratively embodied as a dual processor storage system executing storage operating system 310 that can implement a high-level module, such as a file system, to logically organize the information as a hierarchical structure of named directories, files and special types of files called virtual disks (hereinafter generally "blocks") on the disks. However, it will be apparent to those of ordinary skill in the art that node 300 may alternatively comprise a single or more than two processor system. In an example, processor 304 executes the functions of the network element on the node, while processor 306 executes the functions of the disk element.

In an example, memory 308 illustratively comprises storage locations that are addressable by the processors and adapters for storing software program code and data structures associated with the subject matter of the disclosure. The processor and adapters may, in turn, comprise processing elements and/or logic circuitry configured to execute the software code and manipulate the data structures. Storage operating system 310, portions of which is typically resident in memory and executed by the processing elements, functionally organizes node 300 by, inter alia, invoking storage operations in support of the storage service implemented by the node. It will be apparent to those skilled in the art that other processing and memory means, including various computer readable media, may be used for storing and executing program instructions pertaining to the disclosure described herein.

Illustratively, storage operating system 310 can be the ONTAP® operating system available from NetApp™, Inc., Sunnyvale, Calif. However, it is expressly contemplated that any appropriate storage operating system may be enhanced for use in accordance with the inventive principles described herein. A block diagram and corresponding description of storage operating system 310 is provided below in FIG. 12 and the associated description.

In an example, network adapter 316 provides a plurality of ports adapted to couple node 300 to one or more clients (e.g., client(s) 202) over one or more connections 318, which can be point-to-point links, wide area networks, virtual private networks implemented over a public network (Internet) or a shared local area network. Network adapter 316 thus may include the mechanical, electrical and signaling circuitry needed to connect the node to the network. Illustratively, the computer network may be embodied as an Ethernet network or a Fibre Channel (FC) network. Each client may communicate with the node over network connections by exchanging discrete frames or packets of data according to pre-defined protocols, such as TCP/IP.

In an example, to facilitate access to disks, storage operating system 310 implements a file system that cooperates with cloud network provider 328 to manage data storage using one or more storage devices provided by cloud network provider 328. In an example, the file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (LUNs).

In an example, storage of information on each array is implemented as one or more storage "volumes" that comprise a collection of physical storage disks cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Storage adapter 324 cooperates with storage operating system 310 to access information requested by the clients that is stored locally to node 300. The information may be stored on any attached array of writable storage device media such as video tape, optical, DVD, magnetic tape, bubble memory, electronic random-access memory, micro-electromechanical and any other similar media adapted to store information, including data and parity information. However, as illustratively described herein, the information is stored on disks or an array of disks utilizing one or more connections 322. Storage adapter 324 provides a plurality of ports having input/output (I/O) interface circuitry that couples to the disks over an I/O interconnect arrangement, such as a conventional high-performance CF link topology.

Figure 4:
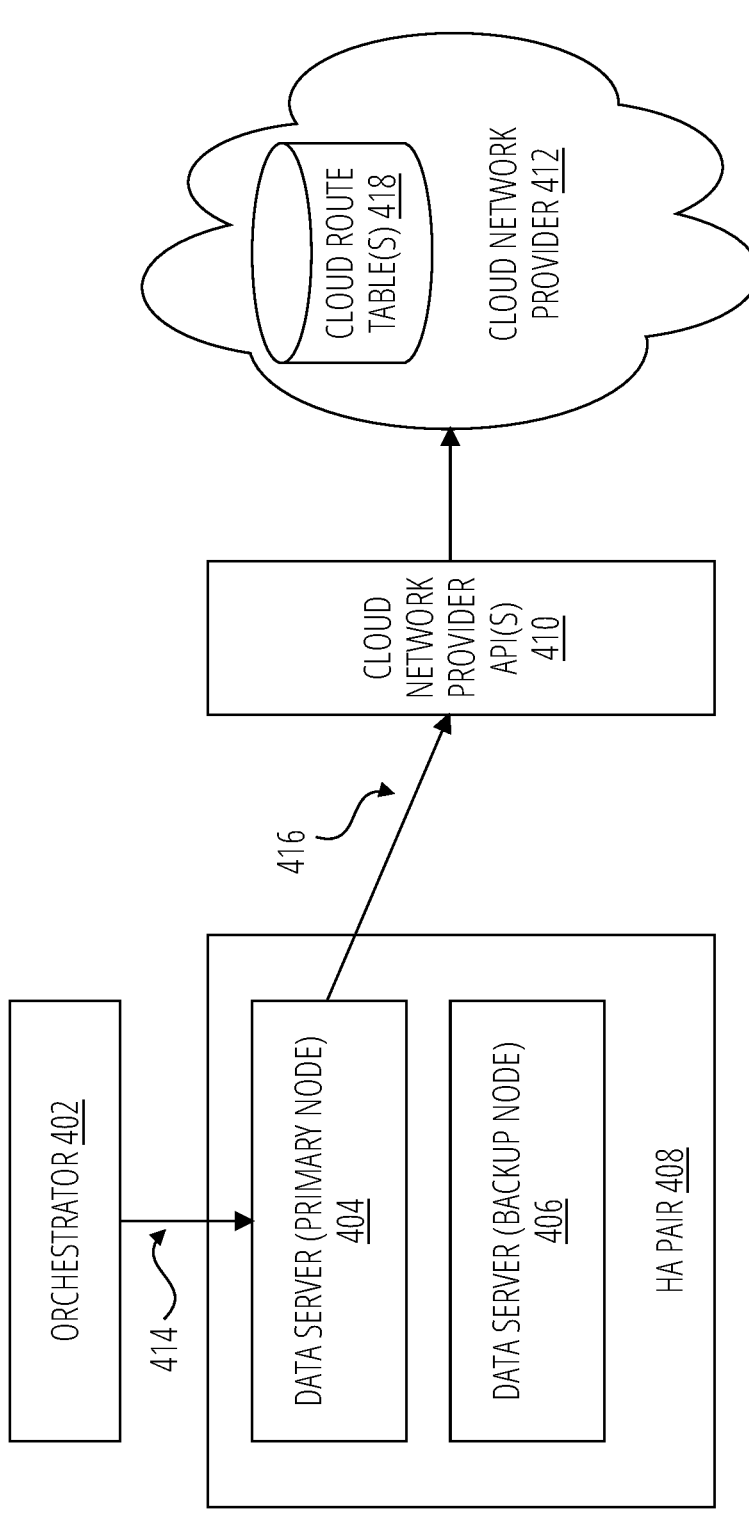
FIG. 4 is a block diagram of an example HA pair corresponding to initial set up and operation.

FIG. 4 is a block diagram of an example HA pair corresponding to initial setup and operation. The description above provides examples and descriptions of nodes that can be configured and operated as HA pairs that utilize cloud storage via one or more cloud storage provider APIs. These examples provide hardware and software architectures that can be used in various configurations, including HA pairs. The following examples describe the use of these nodes as HA pairs configurable to interact with the cloud storage provider using one or more APIs provided by the cloud storage provider.

More specifically, the examples of FIG. 4, FIG. 5, FIG. 8, FIG. 7, FIG. 10, and FIG. 11 provide network address migration using the destination node (or compute instance/virtual machine) to update one or more network configurations in an environment utilizing a cloud storage provider. Thus, in the example of FIG. 4, FIG. 5, FIG. 8, FIG. 7, FIG. 10, and FIG. 11, data server (backup node) 406 manages network address migration (and possibly other operations) in response to, for example, a failure in/of data server (primary node) 404. In various examples, data server (primary node) 404 and data server (backup node) 406 can be virtual machines (VMs) or containers that provide data server functionality (e.g., receive and service requests for data from external client devices).

At a high level, three approaches can be used to support network address change between nodes: 1) a load-balancing approach where an external interface is updated to move the destination reference based on a lack of responses from compute instances (depending on the cloud storage environment being used a load balancing approach may not support failovers with different external subnets); 2) moving the destination address from a network interface for a first compute instance to the network interface on another compute instance (this approach requires both network interfaces be on the same subnet); and 3) use floating destination addresses where the address is outside of the network interface subnet but able to be routed to different network interfaces using available compute environment element (e.g., route tables). Examples of uses of the second and third approaches are described below.

In a high-availability cloud-based environment, the process of transferring control from a first node/compute instance to a second node/compute instance may be based on whether the network address of the first node is in the same local subnet as the cloud service provider interface being used or if the address is external to that subnet. This information can be used to determine which cloud resources are to be modified to re-route traffic to the new node.

A common approach to managing HA pairs is to utilize a "mediator" node or similar resource (e.g., VM) that manages the HA pair externally and can perform failover/transfer functions, such as updating route tables, etc. The mediator can also authenticate, authorize, provision, modify, delete, and cache cloud resources and relevant information to enable, for example, destination address migration between nodes. Various approaches are provided that can result in the elimination of the mediator node functionality when performing destination address migration, which can result in a more efficient and streamlined HA pair architecture. For example, as described with respect to FIG. 8, new levels of parallelism can be unlocked to increase the efficiency of destination address migration in the event of failure of the primary node of an HA pair. As will be seen in the following description, several other advantages can be gained as well.

Storage operating systems (e.g., storage operating system 310, ONTAP) can provide high availability utilizing cloud storage where a failure of a network or instance is detected, and the system continues to provide storage. In an example, the storage operating system supports continuous data availability to a virtual storage system using network-attached storage protocols in a cloud provider environment. Because each cloud provider has unique network and storage environments within the context of a virtual storage system, network configurations need to be reconfigured to allow data access to be moved between compute instances (e.g., from data server (primary node) 404 to data server (backup node) 406).

Supporting operations that can be performed when re-routing traffic include the following. A metadata server (or another component) can acquire or renew authentication credentials. The instance using the credentials and holding connections to the cloud provider can be authenticated (multiple connections may be used to optimize performance, as illustrated, for example, in FIG. 8). Information corresponding to cloud network interface resources may be gathered and maintained, including, for example, caching of information to optimize the number of required calls.

In an example, the resources to be updated as part of the transfer of control can be determined, at least in part, by cloud network interfaces and subnet resources. In an example, caching of some or all of this information can be used to optimize the number of calls required to transfer control. Thus, where applicable, cloud network interface resources are updated and/or configured for each cloud route table(s) are updated to add, modify, or delete routes to match internet protocol (IP) addresses for each cloud network interface resource.

In an example, updates are allowed when resources are shared between accounts including providing credentials and assuming roles where needed to access accounts external to the network interface. As part of traffic re-routing, cloud infrastructure can be updated using the cloud provider APIs by (or under the control of) the destination node/compute instance.

Using the destination compute instance (e.g., data server (backup node) 406) to handle the re-routing provides several advantages over the use of a mediator entity to handle the re-routing. Some potential advantages include eliminating the need for additional compute resources, leveraging available metadata services to reduce the number of calls to the cloud APIs, and/or allowing information to be cached within the compute instance to optimize calls to the cloud APIs. Additional and/or different advantages can also be achieved.

In the example of FIG. 4, orchestrator 402 configures data server (primary node) 404 to operate as the primary node of HA pair 408. In an example, orchestrator 402 configures (e.g., 414) a logical network interface for use by data server (primary node) 404 to access cloud network provider API(s) 410 to utilize resources of cloud network provider 412. In response to the configuration of the created network interface, data server (primary node) 404 can configure (e.g., 416) resources and/or interfaces with cloud network provider 412 to allow data server (primary node) 404 to service requests from clients (not illustrated in FIG. 4) using resources of cloud network provider 412.

In an example, data server (primary node) 404 adds its IP address to one or more interfaces (e.g., cloud network provider API(s) 410) for cloud network provider 412. In another example, data server (primary node) 404 adds one or more routes corresponding to its address to one or more route tables (e.g., cloud route table(s) 418) to be used with cloud network provider API(s) 410 and/or cloud network provider 412. In some configurations, interactions with cloud network provider API(s) 410 utilized a floating private internal ("floating") IP address and one or more corresponding route tables (e.g., cloud route table(s) 418). Once configured (e.g., according to 414 and 416), data server (primary node) 404 can service client data requests using cloud network provider 412. Various examples of architectures for supporting floating IP addresses and corresponding route tables are provided below. The floating IP addressing scheme contrasts with a static private internal IP ("private IP") addressing scheme, which is described in greater detail below.

Figure 5:
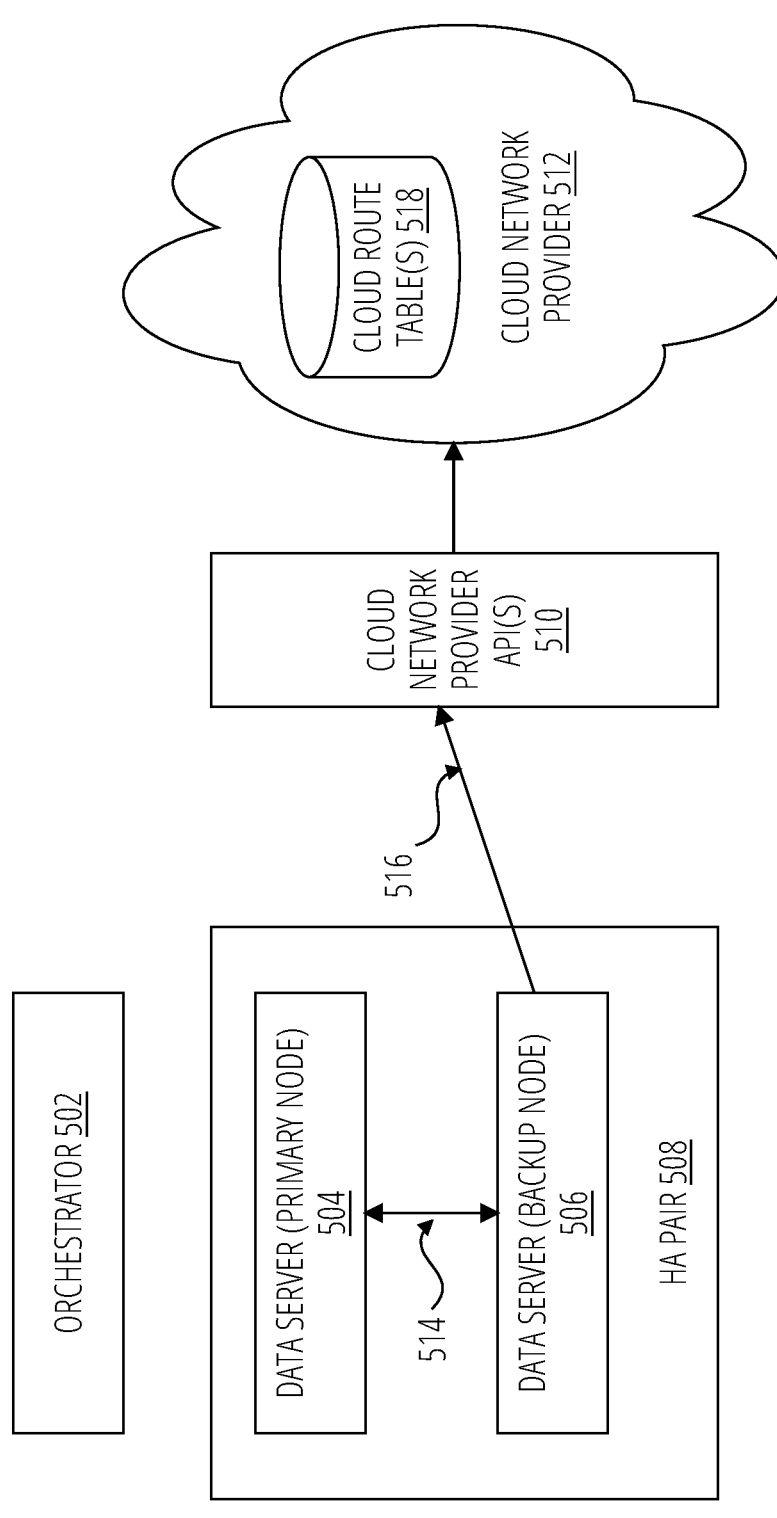
FIG. 5 is a block diagram of an example HA pair corresponding to a failover situation.

FIG. 5 is a block diagram of an example HA pair corresponding to a failover situation. At some point in time after operation as described with respect to FIG. 4 with data server (primary node) 504 servicing client data requests, one or more components of data server (primary node) 504 or one or more connections to data server (primary node) 504 may fail (or begin to fail), which can result in a failover (e.g., failure detected 514) operation. Alternatively, operational control may be passed from data server (primary node) 504 to data server (backup node) 506 as part of an upgrade or maintenance operation.

In the example of FIG. 5, in response to the failure detection data server (backup node) 506 manages the transfer of control and re-routing of traffic from data server (primary node) 504 to data server (backup node) 506. In an example, this process includes moving the internet protocol (IP) address used for traffic from data server (primary node)

504 to data server (backup node) 506, or it includes modifying cloud route table(s) 518 to use the IP address of data server (backup node) 506. Determining which transfer of control and re-routing process data server (backup node) 506 performs is determined based on whether HA pair 508 utilizes a floating IP scheme or a private IP scheme.

Because the configuration illustrated in FIG. 5 corresponds to a failover (or switchover) condition, one or more logical interfaces have been created as described with respect to FIG. 4 using a private IP addressing scheme if data server (primary node) 504 is in the same subnet as the cloud interface, or using a specified floating IP addressing scheme if data server (primary node) 504 is not in the same subnet as the cloud interface. In an example, data server (primary node) 504 creates the created network interfaces (alternatively, an orchestrator can create the logical network interface). In an example, data server (primary node) 504 has also looked up the cloud network interface and has configured and/or cached corresponding information.

In response to the failure of data server (primary node) 504, data server (backup node) 506 determines whether the created network interface uses the private IP addressing scheme or the floating IP addressing scheme. If the created network interface uses the private IP addressing scheme, data server (backup node) 506 calls cloud network provider 512 and reassigns the IP address to the destination network interface (i.e., corresponding to data server (backup node) 506. If the created network interface uses the floating IP addressing scheme, data server (backup node) 506, for each registered routing table, calls cloud network provider 512 to create a route in cloud route table(s) 518 from the IP address of data server (backup node) 506 to cloud network provider API(s) 510.

In an example, data server (backup node) 506 determines that a failover event (e.g., failure detected 514) has occurred and that one or more created network interfaces are to be migrated from data server (primary node) 504 to data server (backup node) 506. As discussed above, in response to the failover event (e.g., failure detected 514) data server (backup node) 506 determines whether a private IP addressing scheme or a floating IP addressing scheme is being used by HA pair 508. In an example, this can be determined based on cached information.

If the addressing scheme being used is a private IP addressing scheme, data server (backup node) 506 calls service cloud network provider 512 (e.g., via cloud network provider API(s)s 510) to reassign the IP address for the destination network interface (e.g., corresponding to data server (backup node) 506). The HA pair failover efficiency improvement that can be gained using this approach is that multiple IP addresses can be updated in a single call (or, alternatively, a reduced number of calls may be necessary to reassign multiple IP addresses), which is described in greater detail in FIG. 11.

If the addressing scheme being used is a floating IP addressing scheme, data server (backup node) 506 calls cloud network provider 512 (e.g., via cloud network provider API(s) 510) to modify the route in cloud route table(s) 518 from the IP address to the updated network interface (e.g., corresponding to data server (backup node) 506). The efficiency improvement that can be gained using this approach is that multiple calls to cloud network provider 512 can be made in parallel (or concurrently, overlapping) to update cloud route table(s) 518 and multiple logical interfaces, which is described in greater detail in FIG. 11.

FIG. 6 illustrates an example flow diagram corresponding to an approach for destination address migration. The functionality of FIG. 6 can be provided for any HA pair in a cloud-based environment.

In block 600, an orchestrator (e.g., orchestrator 102, orchestrator 402, orchestrator 502, orchestrator 802, orchestrator 704) and/or a first node in the HA pair (e.g., storage node 104, node 204, node 300, data server (primary node) 404, data server (primary node) 504, node A 804, storage node 1020, node 1110) creates a network interface either using a static private internal internet protocol (IP) address within a subnet corresponding to the created network interface or using a floating private internal IP address outside of the subnet corresponding to the created network interface. The floating private internal IP address can be used when the nodes of an HA pair are on different subnets, different availability zones, etc.

In block 602, the first node of the HA pair (e.g., storage node 104, node 204, node 300, data server (primary node) 404, data server (primary node) 504, node A 804, storage node 1020, node 1110) registers with a service provider interface. The first node is to be an active data server of the HA pair, and the second node of the HA pair (e.g., storage node 106, node 206, data server (backup node) 406, data server (backup node) 506, node B 806, storage node 1028, node 1120) is to be a backup node of the HA pair. Registering the first node of the HA pair with the service provider interface involves utilizing either the static private internal IP address or the floating private internal IP address. Registration of the first node involves at least adding the floating private internal IP address of the first node to at least one route table corresponding to the service provider interface if the created network interface utilizes the floating private internal IP address.

In block 604, the first node services requests that are received by the first node of the HA pair by accessing the service provider interface using the created network interface.

In block 606, the second node of the HA pair (e.g., storage node 106, node 206, data server (backup node) 406, data server (backup node) 506, node B 806, storage node 1028, node 1120) detects a failure of the first node of the HA pair.

In block 608, the second node of the HA pair determines whether the created network interface utilizes the static private internal IP address or the floating private internal IP address.

In block 610, the second node of the HA pair controls the performance of a failover operation in response to detecting the failure of the first node of the HA pair. If the first node of the HA pair utilized a floating private internal IP address, In that case, the second node of the HA pair registers the second node of the HA pair with the service provider interface by at least adding an address of the second node to at least one route table corresponding to the service provider interface.

In block 612, the second node of the HA pair services requests that are received after performing the failover operation under the control of the second node of the HA pair.

Figure 7:
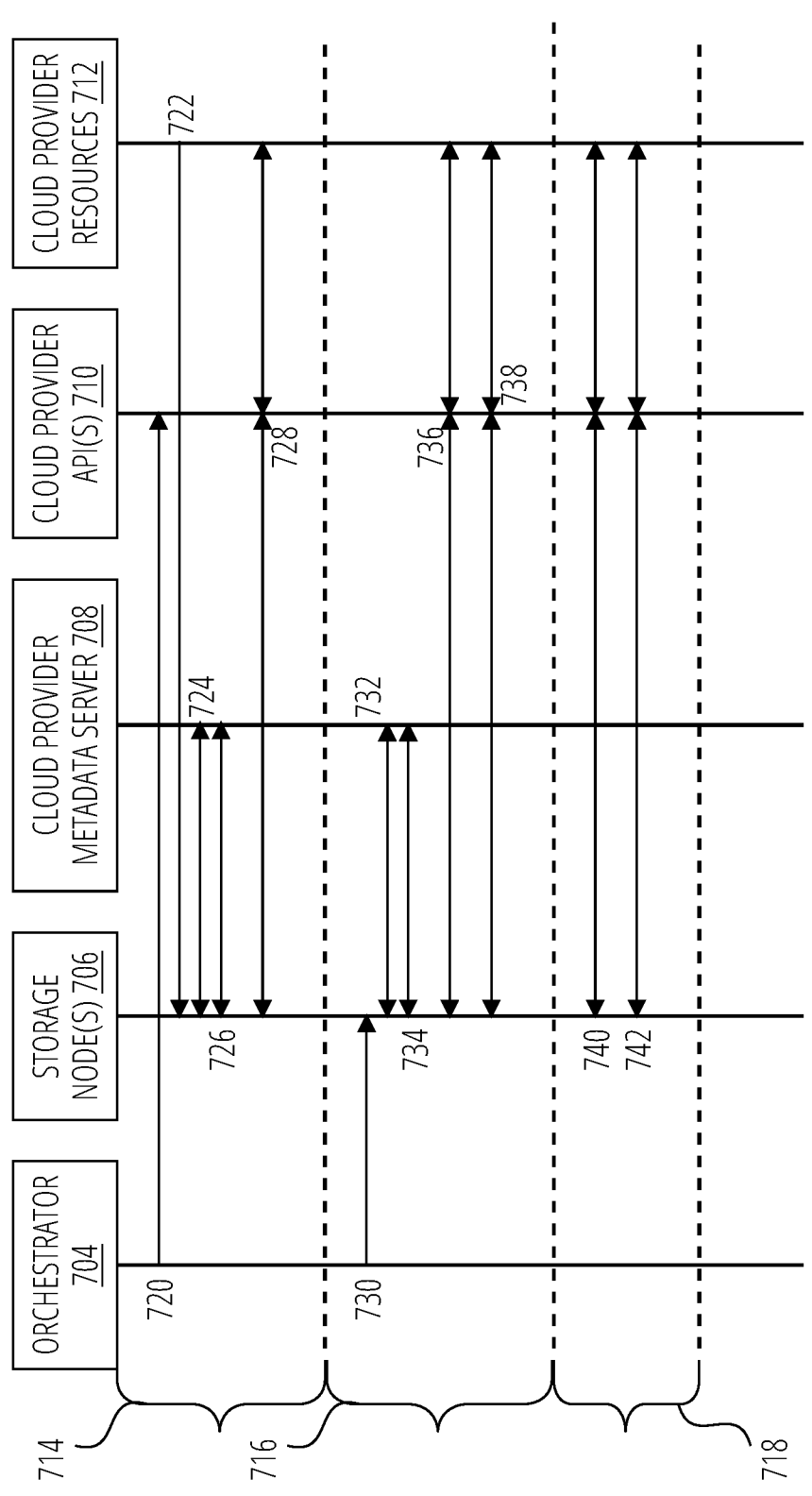
FIG. 7 is a credential-oriented sequence diagram for an example destination address migration operation.

FIG. 7 is a credential-oriented sequence diagram for an example destination address migration operation. The diagram of FIG. 7 illustrates sequences for both the floating IP addressing scheme and the private IP addressing scheme. In operation, only one of these options would be utilized for the storage node (e.g., storage node(s) 706).

The sequences that are illustrated in FIG. 7 can be considered as three phases: provision of storage nodes 714, creation of logical network interface(s) 716, and failover/ migration of created network interface(s) 718. In the first phase, provision of storage nodes 714, orchestrator 704 initiates the creation of storage node instance(s) with roles 720 with cloud provider API(s) 710. In response, cloud provider resources 712 communicates with storage node(s) 706 to create node instance(s) 722. Storage node(s) 706 then communicates with cloud provider metadata server 708 to gather metadata credentials 724. Storage node(s) 706 also communicates with cloud provider metadata server 708 to get role credentials 726. Optionally, storage node(s) 706 can communicate with cloud provider resources 712 via cloud provider API(s) 710 to get external role credentials 728.

In creating logical network interfaces(s) 716 phase, orchestrator 704 initiates network interface creation 730. Storage node(s) 706 then verifies metadata credentials are current 732 and verifies role credentials are current 734. Optionally, storage node(s) 706 can communicate with cloud provider resources 712 via cloud provider API(s) 710 to verify external role credentials 736. Storage node(s) 706 can create one or more routes or assign the private IP address 738.

In the failover/migration of created network interface(s) 718 phase, storage node(s) 706 communicates with cloud provider resources 712 via 710 to verify credentials 740, including, for example, metadata credentials, role credentials, and external role credentials. Storage node(s) 706 then communicates with cloud provider resources 712 via cloud provider API(s) 710 to update route(s) or re-assign private IP address 742. As described above, during the failover/migration of the created network interface(s) 718 phase, the storage node performing the operations is the destination/ backup node taking over for a failed (or otherwise unavailable) node.

Figure 8:
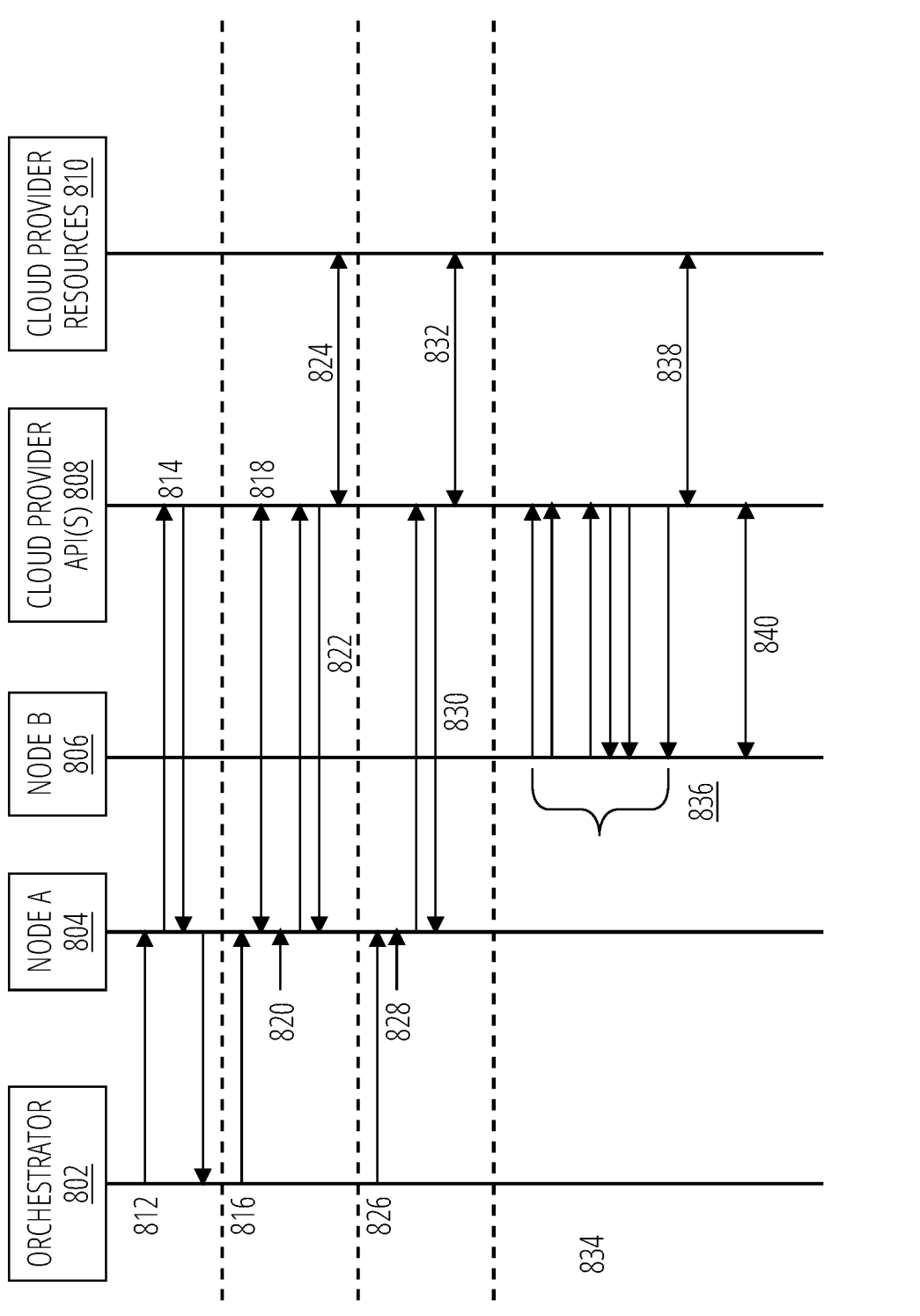
FIG. 8 is an operation-oriented sequence diagram for an example destination address migration operation.

FIG. 8 is an operation-oriented sequence diagram for an example destination address migration operation. The diagram of FIG. 8 illustrates sequences for both the floating private internal IP ("floating address" or "floating IP") addressing scheme and the static private internal IP ("private address" or "private IP") addressing scheme. In operation, only one of these options would be utilized for each node pair (e.g., node A 804 and node B 806).

As an initial pre-operational process, orchestrator 802 registers one or more route tables (e.g., register routing table(s) 812), which causes node A 804 to verify route table access 814 via communication with cloud provider API(s) 808. Confirmation of route table access can be returned to orchestrator 802.

To create a logical network interface (floating IP) 718, orchestrator 802 causes node A 804 to gather interface information 818. In response to determining IP address is floating IP address 820, node A 804 adds the route to registered route table(s) 822 via cloud provider API(s) 808, which causes cloud provider resources 810 to add route(s) 824.

To create a logical network interface (private IP) 728, orchestrator 802 provides 804 with the private IP address to be used. In response to determining IP address is private IP address 828, node A 804 assigns the IP address to its network interface 830 to communicate with cloud provider API(s) 808, which causes an update to one or more interfaces 832.

In response to failover/migrate 834 conditions, node B 806 updates routes and/or interfaces 836. Any number of route tables and/or interfaces can be updated in parallel and/or in an overlapping manner. Updates from node B 806 to cloud provider API(s) 808 are passed to cloud provider resources 810 and confirmed. In an example, cloud provider API(s) 808 can verify updates are complete 840 to node B 806.

Figure 9:
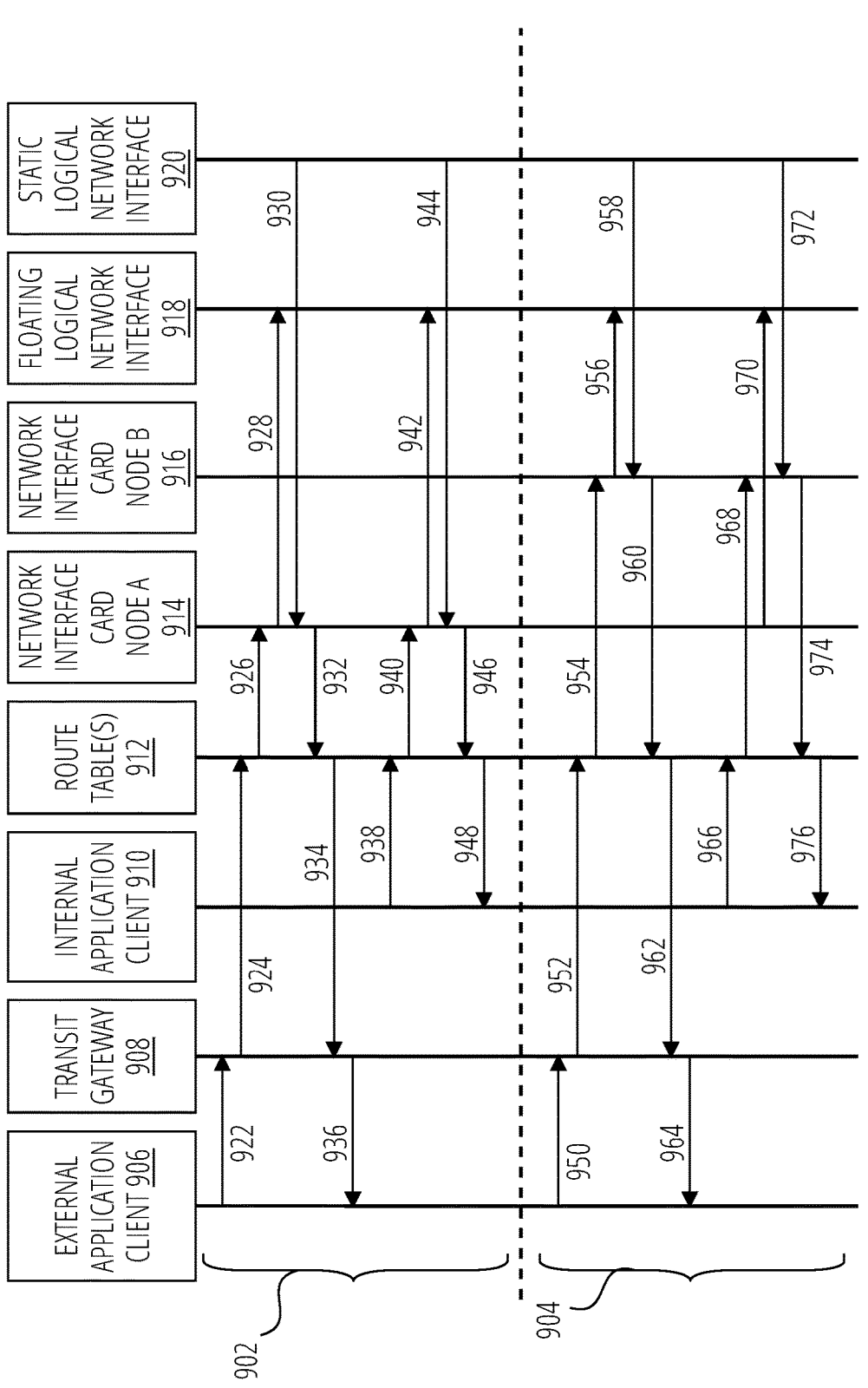
FIG. 9 is a typical flow of packets originating from the application client to the destination address and a corresponding acknowledgment back to the application client.

FIG. 9 is a typical flow of packets originating from the application client to the destination address and a corresponding acknowledgment back to the application client. The sequence diagram of FIG. 9 illustrates both data traffic to floating IP address before failover 902 and data traffic to floating IP address after failover 904. In the example of FIG. 9, to support floating IP addresses, the network interface provided by the cloud network environment provider is configured to allow (no drop) destination IP addresses (e.g., floating IP addresses) other than the provisioned static IP addresses for the network interfaces.

In an example, client devices (e.g., external application client 906, internal application client 910) use floating IP addresses to access storage hosted by storage appliances. In an example, external access to floating IP addresses may be accessed via a cloud provider gateway (e.g., transit gateway 908) that encapsulates floating IP addresses from external networks to allow access to internal cloud network resources (e.g., route table(s) 912). In an example, the return path for the floating IP address packets require the gateway IP address to be on the same subnet, however, because the floating IP address is outside of the network CIDR range, it uses a logical network interface that has been set to a static IP address that is on the same network interface and belongs to the same CIDR range, as a proxy interface to the gateway IP address.

External application client 906 represents a client device that is outside of the cloud network environment similar to, for example, client(s) 202 of FIG. 2. External application client 906 is an electronic device (e.g., computer, mobile device, kiosk, automobile) that requests access to resources managed/controlled by a cloud network environment.

Transit gateway 908 is used to access the cloud network environment, including, for example, route table(s) 912, from an external network or external device (e.g., external application client 906). Route table(s) 912 represent one or more tables (or comparable structures) maintained by the cloud network environment provider to provide routing configuration and related information.

Network interface card node A 914 and network interface card node B 916 represent cloud-provisioned network interfaces that are attached to corresponding compute instances. Floating logical network interface 918 and static logical network interface 920 represent a storage node configuration using a floating IP address or a static IP address for the cloud-provided network interface (e.g., network interface card node A 914, and network interface card node B 916).

In an example, during phase 902, external application client 906 can send a packet to a floating IP destination address (922) that is transmitted to transit gateway 908. Transit gateway 908 utilizes route table(s) 912 to determine the appropriate destination address (924). The packet is forwarded (926) to the network interface (network interface card node A 914) that is set as the floating IP destination address in route table(s) 912. Connection 928 illustrates network interface card node A 914 is configured with the floating IP address corresponding to floating logical network interface 918.

In an example, return packets use routing destination configured for the corresponding static IP address for the next hop (930) from network interface card node A 914 to route table(s) 912 (932). The return packet is routed to transit gateway 908 (934) and back to external application client 906 (936).

In an example, during phase 902, internal application client 910 can send a packet to a floating IP destination address (938) that utilizes route table(s) 912 to forward the packet to the network interface set as the floating IP destination (940), which, in the example of FIG. 9, is network interface card node A 914. Connection 942 illustrates network interface card node A 914 is configured with the floating IP address corresponding to floating logical network interface 918.

In an example, return packets use routing destination configured for the corresponding static IP address for the next hop (944) from network interface card node A 914 to route table(s) 912 (946). The return packet is routed to internal application client 910 (948).

In an example, during phase 904, external application client 906 can send a packet to a floating IP destination address (950) that is transmitted to transit gateway 908. Transit gateway 908 utilizes route table(s) 912 to determine the appropriate destination address (952). The packet is forwarded (854) to the network interface (network interface card node B 916) that is updated as the floating IP destination address in route table(s) 912. Connection 956 illustrates network interface card node B 916 is configured with the floating IP address corresponding to floating logical network interface 918.

In an example, return packets use routing destination configured for the corresponding static IP address for the next hop (858) from network interface card node B 916 to route table(s) 912 (960). The return packet is routed to transit gateway 908 (962) and to external application client 906 (964).

In an example, during phase 904 (i.e., after failover/switchover), internal application client 910 can send a packet to a floating IP destination address (966) that utilizes route table(s) 912 to forward the packet to the network interface set as the floating IP destination (868), which, in the example of FIG. 9, is network interface card node B 916. Connection 956 illustrates network interface card node B 916 is configured with the floating IP address corresponding to floating logical network interface 918.

In an example, return packets use routing destination configured for the corresponding static IP address for the next hop (972) from network interface card node B 916 to route table(s) 912 (974). The return packet is routed to internal application client 910 (976).

Figure 10:
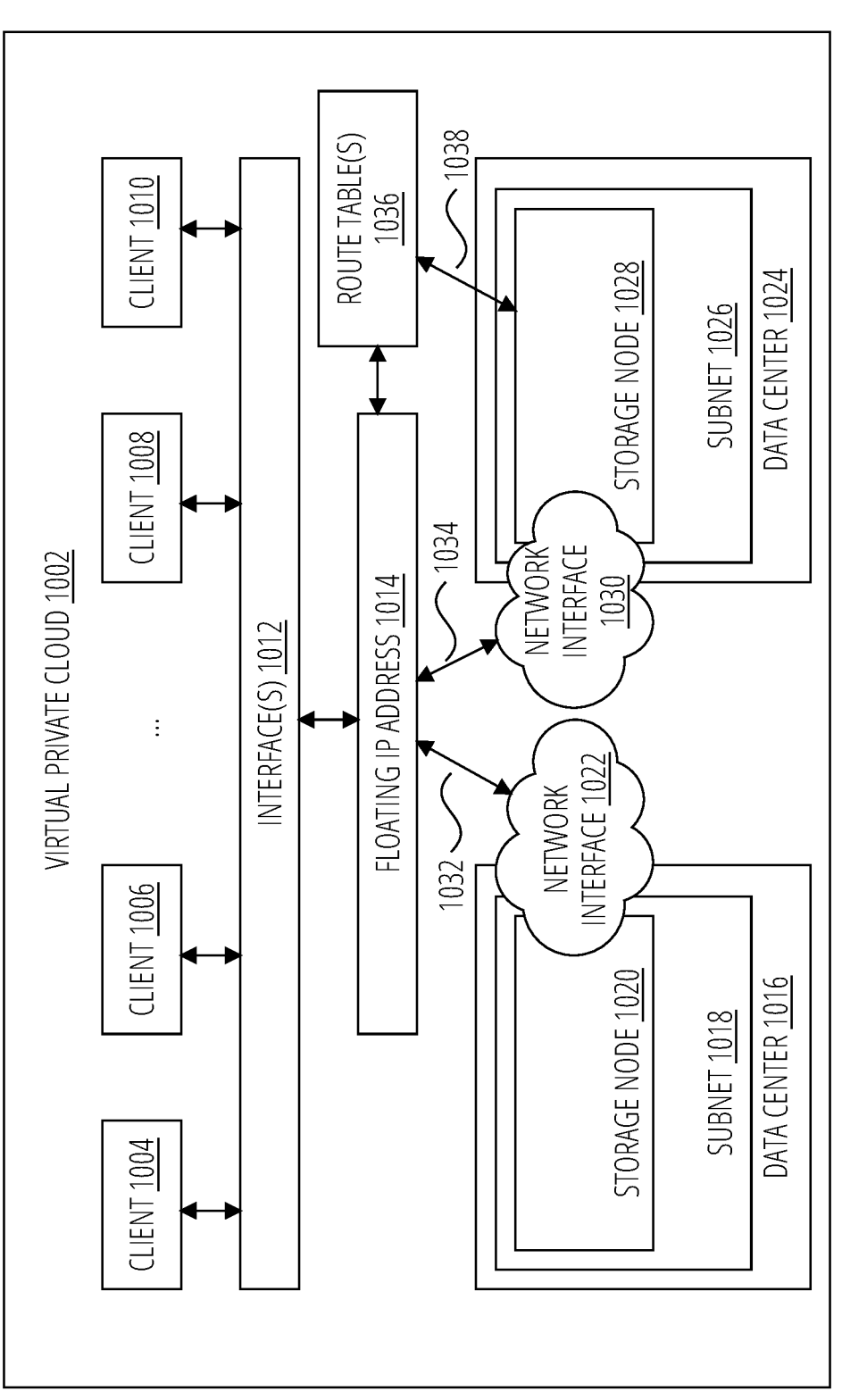
FIG. 10 is a block diagram of an example virtual private cloud having an HA pair utilizing a floating IP address.

FIG. 10 is a block diagram of an example virtual private cloud having an HA pair utilizing a floating IP address. In an example, virtual private cloud 1002 allows customers to define and provision a logically isolated section of the cloud environment where resources of the cloud environment can be utilized by the virtual private cloud 1002. An example of a cloud environment that can provide a virtual private cloud is Amazon Web Services (AWS), which is a subsidiary of AMAZON.COM, INC., of Seattle, Washington. AWS provides on-demand cloud computing platforms and APIs to customers that can use the available resources for custom configurable purposes. AWS can be used as, for example, cloud storage provider 116, cloud storage provider 218, cloud network provider 328, cloud network provider 412, cloud network provider 512, etc. Other cloud service providers include, for example, MICROSOFT AZURE and IBM CLOUD (also known as BLUEMIX). Each cloud service provider may have unique characteristics and APIs and thus present a unique set of operations and configurations necessary to achieve the desired results.

In the AWS example, the customer has control over the virtual network environment, including, for example, the selection of IP address ranges, creation of subnets, configuration of route tables and network gateways, etc. The customer can leverage multiple layers of security, including, for example, security groups and network access control lists. Also, in the AWS environment, virtual private clouds (VPCs) can span over multiple availability zones in a given region. In an example, a subnet in a VPC is associated with a single availability zone (i.e., a subnet does not span multiple availability zones). An availability zone is a data center that shares no service-critical components (e.g., power, cooling, access) with any other availability zone. Availability zones can be geographically separated (e.g., to prevent local disasters from impacting more than one availability zone). In some examples, the two nodes of an HA pair are in different availability zones, which increases the complexity of operating the two nodes as an HA pair.

In the example of FIG. 10, elastic network interfaces (ENIs), which are virtual network interfaces that can be attached to an instance of a VPC, can be used. In an example, an ENI has a primary private IP address, can have one or more secondary private IP addresses, has a MAC address, and has one or more security groups. An ENI can be attached to a first VPC instance, detached from the first VPC instance, and reattached to a second VPC instance.

In an AWS-based example environment, the assignment of IP addresses to an ENI is done by the cloud environment (e.g., AWS) when an instance is created. The IP address is assigned from a subnet that the ENI is attached to automatically if one is not specified. It is possible to move an IP address from one ENI to another ENI. This requires executing an AWS API to reassociate the IP address with an ENI.

AWS (and similar) environments can provide elastic IP addresses, which are static IP addresses associated with an account. The elastic IP address is not associated with a particular VPC instance but instead with a VPC instance IP address. It is possible to reassociate an elastic IP address to a different IP address on the same or different VPC instance. Elastic IP addresses are not tied to an availability zone. Thus, the straightforward solution may be to use the elastic IP addresses to manage failovers. However, the elastic IP addresses would then only be accessible through a publicly accessible internet gateway, which makes the solution unsuitable for certain (e.g., enterprise) customers.

An elastic IP address can be used to manage a failover when the created network interface is moved between nodes of an HA pair that reside in different availability zones. The elastic IP address was designed for web servers and is a wide area network (WAN) accessible IP address. In many situations, a customer may not want to expose network attached storage (NAS) and/or storage area network (SAN) appliances on a WAN. Thus, as illustrated in FIG. 10, the floating IP address construct can be used to manage failovers between nodes that reside in different availability zones.

In FIG. 10, virtual private cloud 1002 environment includes any number of client devices (e.g., client 1004, client 1006, client 1008, client 1010) communicate through interface(s) 1012, which can include, for example, network file system (NFS) interfaces, common internet file system (CIFS) interfaces, internet small computer system interface (iSCSI) interfaces, etc. In an example, interface(s) 1012 use floating IP address 1014 to interact with storage nodes within virtual private cloud 1002. Pairs of storage nodes within virtual private cloud 1002 can be configured to operate as HA pairs and utilize the failover/migration approaches described herein.

In an example, virtual private cloud 1002 supports classless inter-domain routing (CIDR), which is an IP address allocation mechanism. For example, virtual private cloud 1002 can have CIDR: 10.0.0.0/16. This is just one possible example from a broad range of possible CIDR allocations. In the example of FIG. 10, floating IP address 1014 can be 1.1.1.1; however, any available, legitimate IP address could be used.

In the example architecture of FIG. 10, virtual private cloud 1002 operates as the primary node of an HA pair, and storage node 1028 operates as the backup node of the HA pair. As discussed above, it may be advantageous to have nodes of an HA pair in different availability zones. Thus, virtual private cloud 1002 may reside in data center 1016 and be assigned to subnet 1018, and storage node 1028 may reside in data center 1024 and be assigned to subnet 1026. Further, storage node 1020 and storage node 1028 each run a storage operating system (e.g., storage operating system 310, storage operating system 1200).

The storage operating systems of the respective storage nodes can manage the corresponding network interfaces (e.g., network interface 822 for storage node 820 and network interface 1030 for storage node 1028) as ENIs. In the example of FIG. 10, consider subnet 1018 as having IP addresses 10.0.0.0/24 and subnet 1026 as having IP addresses 10.0.1.0/24. Further, network interface 1022 has the IP address 10.0.0.1, and network interface 1030 has the IP address 10.0.1.1. For regular operation, when both storage nodes of the HA pair are available, route table(s) 1036 has an entry mapping floating IP address 1014 (1.1.1.1) to network interface 1022 (10.0.0.1). Requests from client devices can utilize floating IP address 1014 (1.1.1.1) to access storage node 1020 (10.0.0.1).

Upon failover, route table(s) 1036 is updated by storage node 1028 to route traffic to storage node 1028 instead of storage node 1020 by updating the storage node 1028 entry for floating IP address 1014 (1.1.1.1) to be mapped to storage node 1028 (10.0.1.1). Requests from client devices after the failover can continue to utilize floating IP address 1014 (1.1.1.1) but access storage node 1028 (10.0.1.1) instead of storage node 1020 (10.0.0.1). Thus, failover can occur without disruption to client devices. As discussed above, multiple parallel or concurrent updates to route table(s) 1036 can be performed to provide a more efficient failover operation. Example configurations where multiple parallel or concurrent updates to route table(s) 1036 can be performed are described below in FIG. 11.

Figure 11:
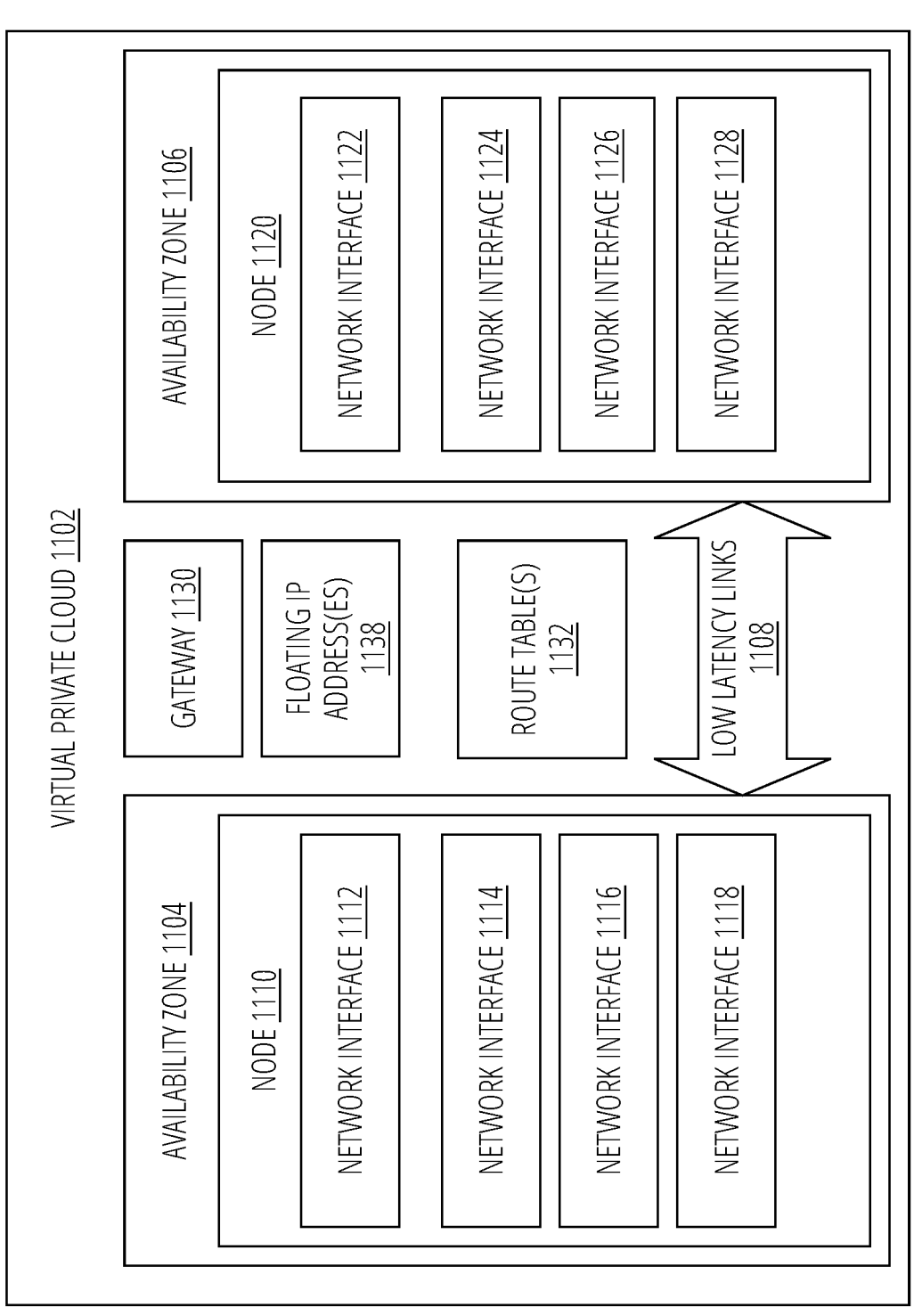
FIG. 11 is a block diagram of an example virtual private cloud having an HA pair each having multiple network interfaces utilizing a floating IP address.

FIG. 11 is a block diagram of an example virtual private cloud having an HA pair each having multiple network interfaces utilizing a floating IP address. Virtual private cloud 1102 is illustrated as having two nodes (e.g., node 1110, node 1120) configured as an HA pair; however, virtual private cloud 1102 can include any number of nodes and corresponding network interfaces.

In the example of FIG. 11, assume that virtual private cloud 1102 is assigned CIDR: 10.0.0/16. Gateway 1130 can be a virtual private gateway to connect to a virtual private network (VPN), or gateway 1130 can be an internet gateway to connect to an external WAN (e.g., the Internet). Route table(s) 1132 operates as described above but includes multiple entries per node because each node has multiple network interfaces, each having a corresponding IP address.

In the example of FIG. 11, node 1110 resides in availability zone 1104 and includes network interface 1112, network interface 1114, network interface 1116, and network interface 1118. Similarly, node 1120 resides in availability zone 1106 and includes network interface 1122, network interface 1124, network interface 1126, and network interface 1128. In other configurations, the nodes can include a different set of interfaces. In an example, availability zone 1104 and availability zone 1106 are connected by low latency links 1108.

In an example, in the HA pair configuration, as illustrated, each node has four virtual network adapters; however, any number of virtual network adapters can be supported. Each node can utilize any number of subnets to be configured in their corresponding availability zones. In an example, one subnet can be used for data traffic, and the other subnet is used for other purposes (e.g., management traffic, overhead traffic). In an example, each of the virtual network adapters is an ENI with corresponding IP addresses and can communicate with corresponding virtual network adapters of other nodes.

To provide specific examples for the purposes of illustration, assume that network interface 1112 has IP addresses 10.0.1.2 and 10.0.1.3 to operate over a data network subnet for 10.0.1.0/24, which is the first subnet used by availability zone 1104. The remaining virtual network adapters, network interface 1114 having IP address 10.0.3.2, network interface 1116 having IP address 10.0.3.4, and network interface 1118 having IP address 10.0.3.5 can operate over a subnet for 10.0.3.0/24.

Similarly, assume that network interface 1122 has IP addresses 10.0.2.2 and 10.0.2.3 to operate over a data and management network subnet for 10.0.2.0/24, which is the first subnet used by availability zone 1106. The remaining virtual network adapters, network interface 1124 having IP address 10.0.5.2, network interface 1126 having IP address 10.0.5.4, and network interface 1128 having IP address 10.0.5.5 can operate over a subnet for 10.0.5.0/24.

The example of FIG. 11 is one where each node has a network interface on a subnet (e.g., network interface 1112 in node 1110 and network interface 1122 in node 1120), and the remaining network interfaces are on a second subnet. In alternate configurations, different arrangements can be supported; for example, each network interface can have an associated subnet. As another example, two of four network interfaces can each have an associated subnet, and the other two network interfaces (in a four network interface example) can use a common subnet. In the various examples, addresses corresponding to the network interfaces and subnets would be allocated according to those configurations. A floating IP address can be associated with any network interface attached to a node because the floating IP address is internal to the HA pair functionality within gateway 1130 and not accessible from outside gateway 1130.

In response to a failover (or migration) operation, route table(s) 1132 can be updated in the manner described above for each of the network interfaces so that floating IP address(es) 1138 can be used to access node 1120 rather than node 1110. Multiple parallel or concurrent updates to route table(s) 1132 can be performed to provide a more efficient failover operation.

Returning to the AWS example, when a client device sends a packet directed to the floating IP address, the AWS router will route the request to the network interface indicated by the route table. Unlike an AWS elastic IP address (where the AWS router would modify the packet and modify the destination to the private IP address mapped to the ENI), a packet destined to a floating IP address is sent unmodified to the ENI. This implies that the client receiving the packets should be aware of the floating IP address. In the event a controller fails, the surviving controller, during the takeover operation, will patch the AWS router to remap the floating IP address to one of its network interfaces.

Figure 12:
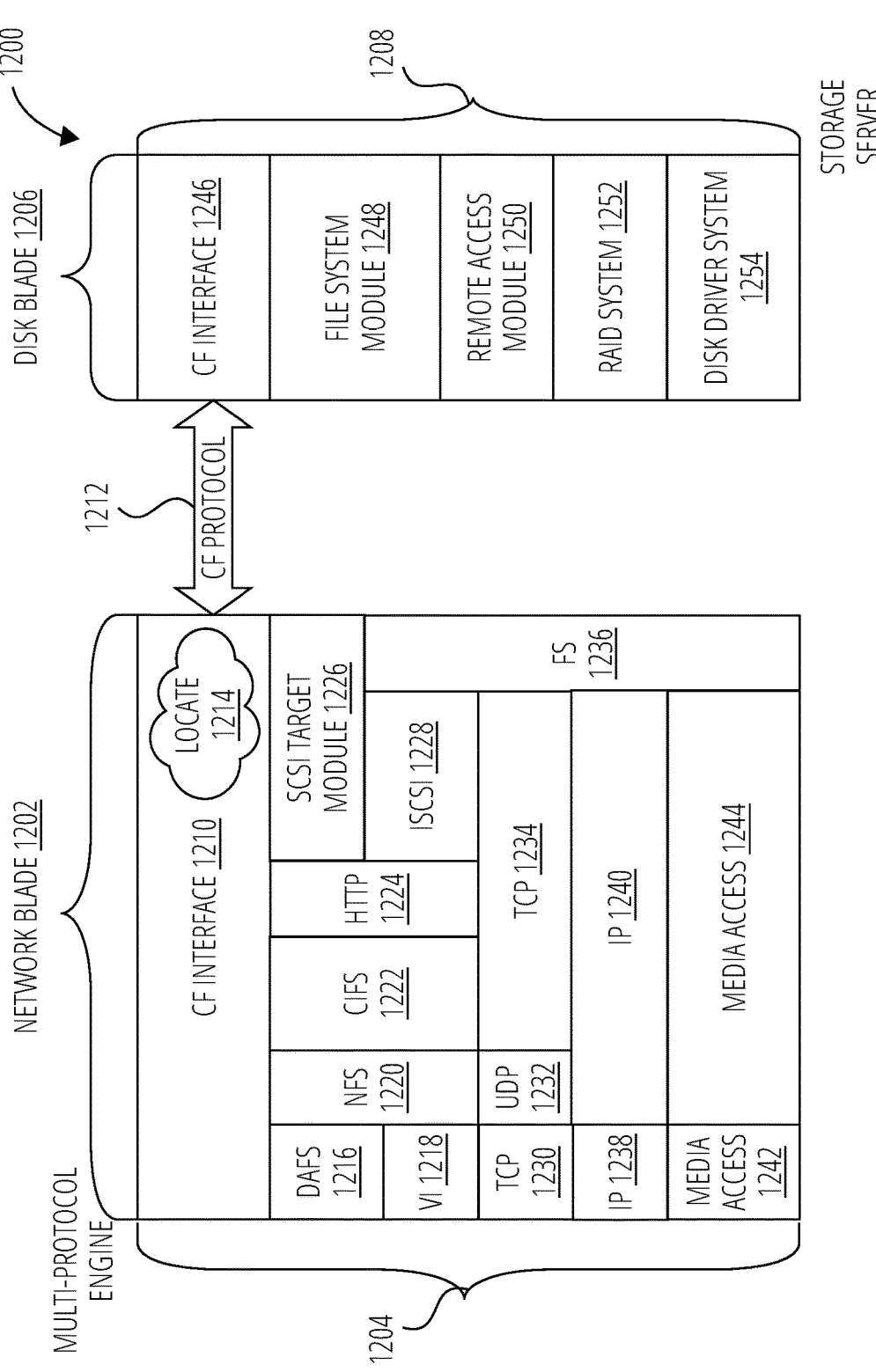
FIG. 12 is a block diagram of an example HA pair utilizing a floating IP address scheme in a virtual private cloud environment.

FIG. 12 is a schematic block diagram of a storage operating system that may be advantageously used with the subject matter. Storage operating system 1200 includes a series of software layers organized to form an integrated network protocol stack or, more generally, multi-protocol engine 1204 that provides data paths for clients to access information stored on a node using block and file access protocols. In an example, multi-protocol engine 1204 includes a media access layer (e.g., media access 1242, media access 1244) of network drivers (e.g., gigabit Ethernet drivers) that interfaces to network protocol layers, such as the Internet Protocol (IP) layer (e.g., IP 1238, IP 1240) and the corresponding supporting transport mechanisms, the Transport Control Protocol (TCP) layer (e.g., TCP 1230, TCP 1234) and the User Datagram Protocol (UDP) layer (e.g., UDP 1232).

An example file system (FS) protocol layer (e.g., FS 1236) provides multi-protocol file access and, to that end, includes support for Direct Access File System (DAFS) protocol (e.g., DAFS 1216), Network File System (NFS) protocol (e.g., NFS 1220), Common Internet File System (CIFS) protocol (e.g., CIFS 1222) and the Hypertext Transfer Protocol (HTTP) (e.g., HTTP 1224). Virtual Interface (VI) layer (e.g., VI 1218) implements an architecture to provide direct access transport (DAT) capabilities, such as Remote Direct Memory Access (RDMA), to support Direct Access File System (DAFS) protocol (e.g., DAFS 1216).

An Internet Small Computer Systems Interface (iSCSI) driver layer (e.g., iSCSI 1228) provides block protocol access over TCP/IP network protocol layers, while a Cluster Fabric (CF) driver layer (e.g., CF interface 1210) receives and transmits block access requests and responses to and from the node. In an example, the CF and iSCSI drivers provide CF-specific and iSCSI-specific access control to the blocks and, thus, manage exports of LUNs to either iSCSI or FCP or, alternatively, to both iSCSI and FCP when accessing the blocks on the node.

In addition, storage operating system 1200 includes a series of software layers organized to form storage server 1208 that provides data paths for accessing information stored on disks of a node. To that end, storage server 1208 includes file system module 1248 in cooperating relation with remote access module 1250, RAID system 1252 and disk driver system 1254. RAID system 1252 manages the storage and retrieval of information to and from the volumes/disks in accordance with I/O operations, while disk driver system 1254 implements a disk access protocol such as, e.g., the SCSI protocol.

File system module 1248 implements a virtualization system of storage operating system 1200 through the interaction with one or more virtualization modules illustratively embodied as, e.g., a virtual disk (vdisk) module (not shown) and SCSI target module 1226. SCSI target module 1226 is generally disposed between the FC and iSCSI 1228, file system 1236 and file system 1248 to provide a translation layer of the virtualization system between the block (LUN) space and the file system space, where LUNs are represented as blocks.

File system module 1248 is illustratively a message-based system that provides logical volume management capabilities for use in access to the information stored on the storage devices, such as disks. That is, in addition to providing file system semantics, file system module 1248 provides functions normally associated with a volume manager. These functions include (i) aggregation of the disks, (ii) aggregation of storage bandwidth of the disks, and (iii) reliability guarantees, such as mirroring and/or parity (RAID).

File system module 1248 illustratively implements an exemplary a file system having an on-disk format representation that is block-based using, e.g., 4 kilobyte (kB) blocks and using index nodes ("inodes") to identify files and file attributes (such as creation time, access permissions, size and block location). File system module 1248 uses files to store meta-data describing the layout of its file system; these meta-data files include, among others, an inode file. A file handle, i.e., an identifier that includes an inode number, is used to retrieve an inode from disk. As described in greater detail below, a rebalancing scanner can operation in storage operating system 1200 that supports inodes to scan and evaluate files in order to find one or more candidate files to move to a remote container.

Broadly stated, all inodes of the write-anywhere file system are organized into the inode file. A file system (FS) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from a client is forwarded as a packet over a computer network and onto a node where it is received via a network adapter. A network driver processes the packet and, if appropriate, passes it on to a network protocol and file access layer for additional processing prior to forwarding to the write-anywhere file system. Here, the file system generates operations to load (retrieve) the requested data from disk if it is not resident "in core", i.e., in memory. If the information is not in memory, the file system indexes into the inode file using the inode number to access an appropriate entry and retrieve a logical vbn. The file system then passes a message structure including the logical vbn to, for example, RAID system 1252; the logical vbn is mapped to a disk identifier and disk block number (disk,dbn) and sent to an appropriate driver (e.g., SCSI) of the disk driver system. The disk driver accesses the dbn from the specified disk and loads the requested data block(s) in memory for processing by the node. Upon completion of the request, the node (and operating system) returns a reply to the client over the network.

Remote access module 1250 is operatively interfaced between file system module 1248 and RAID system 1252. Remote access module 1250 is illustratively configured as part of the file system to implement the functionality to determine whether a newly created data container, such as a subdirectory, should be stored locally or remotely. Alternatively, remote access module 1250 may be separate from the file system. As such, the description of remote access module 1250 being part of the file system should be taken as exemplary only. Further, remote access module 1250 determines which remote flexible volume should store a new subdirectory if a determination is made that the subdirectory is to be stored remotely. More generally, remote access module 1250 implements the heuristics algorithms used for the adaptive data placement. However, it should be noted that the use of a remote access module should be taken as illustrative. In alternative aspects, the functionality may be integrated into the file system or other module of the storage operating system. As such, the description of remote access module 1250 performing certain functions should be taken as exemplary only.

It should be noted that while the subject matter is described in terms of locating new subdirectories, the principles of the disclosure may be applied at other levels of granularity, e.g., files, blocks, etc. As such, the description contained herein relating to subdirectories should be taken as exemplary only.

It should be noted that the software "path" through the storage operating system layers described above needed to perform data storage access for the client request received at the node may alternatively be implemented in hardware. That is, a storage access request data path may be implemented as logic circuitry embodied within a field programmable gate array (FPGA) or an application specific integrated circuit (ASIC). This type of hardware implementation increases the performance of the storage service provided by the node in response to a request issued by client 180. Alternatively, the processing elements of adapters (e.g., network adapter 316, storage adapter 324, cluster access adapter 320) may be configured to offload some or all of the packet processing and storage access operations, respectively, from the processor (e.g., processor 304, processor 306), to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node, implement data access semantics of a general-purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that aspects of the disclosure described herein may apply to any type of special-purpose (e.g., file server, filer or storage serving appliance) or general-purpose computer, including a standalone computer or portion thereof, embodied as or including a storage system. Moreover, the teachings contained herein can be adapted to a variety of storage system architectures including, but not limited to, a network-attached storage environment, a storage area network and disk assembly directly attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the subject matter may be utilized with any suitable file system, including a write in place file system.

Illustratively, storage server 1208 is embodied as disk blade 1206 of storage operating system 1200 to service one or more volumes of a disk array (e.g., disk array 222). In addition, multi-protocol engine 1204 is embodied as network blade 1202 to: (i) perform protocol termination with respect to a client issuing incoming data access request packets over a network, as well as (ii) redirect those data access requests to any storage server of the cluster. Moreover, network blade 1202 and disk blade 1206 cooperate to provide a highly scalable, distributed storage system architecture for a cluster (e.g., cluster 200). To that end, each module includes a cluster fabric (CF) interface module (e.g., CF interface 1210, CF interface 1246) adapted to implement intra-cluster communication among the modules (e.g., utilizing CF protocol 1212), including disk element to disk element communication for data container striping operations, for example.

The protocol layers, e.g., the NFS/CIFS layers and the iSCSI/IFC layers, of network blade 1202 function as protocol servers that translate file-based and block-based data access requests from clients into CF protocol messages used for communication with disk blade 1206. That is, the network element servers convert the incoming data access requests into file system primitive operations (commands) that are embedded within CF messages by CF interface 1210 for transmission to disk blade 1206. Notably, CF interface 1210 and CF interface 1246 cooperate to provide a single file system image across all disk blades in a cluster. Thus, any network port of a network element that receives a client request can access any data container within the single file system image located on any disk element of the cluster.

Further, in an illustrative aspect of the disclosure, network blade 1202 and disk blade 1206 are implemented as separately scheduled processes of storage operating system 1200; however, in an alternate aspect, the network blade 1202 and disk blade 1206 may be implemented as pieces of code within a single operating system process. Communication between a network element and disk element is thus illustratively affected through the use of message passing between the modules although, in the case of remote communication between a network element and disk element of different nodes, such message passing occurs over cluster switching fabric 216. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp™, Inc.

CF interface 1210 and CF interface 1246 implement a CF protocol for communicating file system commands among the modules of the cluster. Communication is illustratively affected by the disk element exposing the CF API to which a network element (or another disk element) issues calls. To that end, the CF interface modules are organized as a CF encoder and CF decoder. The CF encoder encapsulates a CF message as (i) a local procedure call (LPC) when communicates a file system command to a disk element residing on the same node or (ii) a remote procedure call (RPC) when communicating the command to a disk element residing on a remote node of the cluster. In either case, the CF decoder de-encapsulates the CF message and processes the file system command.

Illustratively, the remote access module may utilize CF messages to communicate with remote nodes to collect information relating to remote flexible volumes. A CF message is used for RPC communication over the switching fabric between remote modules of the cluster; however, it should be understood that the term "CF message" may be used generally to refer to LPC and RPC communication between modules of the cluster. The CF message includes a media access layer, an IP layer, a UDP layer, a reliable connection (RC) layer and a CF protocol layer. The CF protocol is a generic file system protocol that conveys file system commands related to operations contained within client requests to access data containers stored on the cluster; the CF protocol layer is that portion of a message that carries the file system commands. Illustratively, the CF protocol is datagram based and, as such, involves transmission of messages or "envelopes" in a reliable manner from a source (e.g., network blade 1202) to a destination (e.g., disk blade 1206). The RC layer implements a reliable transport protocol that is adapted to process such envelopes in accordance with a connectionless protocol, such as UDP.

In one embodiment, a data container is represented in the write-anywhere file system as an inode data structure adapted for storage on the disks 234. In such an embodiment, an inode includes a meta-data section and a data section. The information stored in the meta-data section of each inode describes the data container (e.g., a file) and, as such, includes the type (e.g., regular, directory, vdisk) of file, its size, time stamps (e.g., access and/or modification time) and ownership (e.g., user identifier (UID) and group ID (GID), of the file, and a generation number. The contents of the data section of each inode may be interpreted differently depending upon the type of file (inode) defined within the type field. For example, the data section of a directory inode includes meta-data controlled by the file system, whereas the data section of a regular inode includes file system data. In this latter case, the data section includes a representation of the data associated with the file.

Specifically, the data section of a regular on-disk inode may include file system data or pointers, the latter referencing 4 KB data blocks on disk used to store the file system data. Each pointer is preferably a logical vbn to facilitate efficiency among the file system and the RAID system when accessing the data on disks. Given the restricted size (e.g., 232 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section of the inode (e.g., a second level inode) references an indirect block (e.g., a first level L1 block) that contains 1024 pointers, each of which references a 4 KB data block on disk. For file system data having a size greater than 64 MB, each pointer in the data section of the inode (e.g., a third level L3 inode) references a double-indirect block (e.g., a second level L2 block) that contains 1024 pointers, each referencing an indirect (e.g., a first level L1) block. The indirect block, in turn, which contains 1024 pointers, each of which references a 4 kB data block on disk. When accessing a file, each block of the file may be loaded from disk into the memory.

When an on-disk inode (or block) is loaded from disk into memory, its corresponding in-core structure embeds the on-disk structure. For example, the dotted line surrounding the inode indicates the in-core representation of the on-disk inode structure. The in-core structure is a block of memory that stores the on-disk structure plus additional information needed to manage data in the memory (but not on disk). The additional information may include, e.g., a "dirty" bit. After data in the inode (or block) is updated/modified as instructed by, e.g., a write operation, the modified data is marked "dirty" using the dirty bit so that the inode (block) can be subsequently "flushed" (stored) to disk.

According to one embodiment, a file in a file system comprises a buffer tree ("buftree") that provides an internal representation of blocks for a file loaded into memory and maintained by the write-anywhere file system. A root (top-level) inode, such as an embedded inode, references indirect (e.g., level 1) blocks. In other embodiments, there may be additional levels of indirect blocks (e.g., level 2, level 3) depending upon the size of the file. The indirect blocks (e.g., and inode) includes pointers that ultimately reference data blocks used to store the actual data of the file. That is, the data of file are contained in data blocks and the locations of these blocks are stored in the indirect blocks of the file. Each level 1 indirect block may include pointers to as many as 1024 data blocks.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

The terms "component", "module", "system," and the like as used herein are intended to refer to a computer-related entity, either software-executing general-purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

What is claimed is:

1. A method for network address migration utilizing a destination compute instance of a high availability (HA) pair to update a network configuration in a cloud computing environment, wherein the HA pair communicates with the cloud computing environment via, the method comprising:

creating a network interface either using a private address within a subnet corresponding to the created network interface or using a floating address outside of the subnet corresponding to the created network interface;

registering a first node of the HA pair with a service provider interface, the first node to be an active data server of the HA pair and a second node of the HA pair to be a backup node of the HA pair, wherein registering the first node of the HA pair with the service provider interface comprises utilizing either the private address or the floating address, wherein registration comprises at least adding the floating address of the first node to at least one route table corresponding to the service provider interface if the created network interface utilizes the floating address;

servicing requests received by the first node of the HA pair by accessing the service provider interface using the created network interface;

detecting a failure of the first node of the HA pair;

determining, with the second node of the HA pair, whether the created network interface utilizes the private address or the floating address;

performing a failover operation under control of the second node of the HA pair in response to detecting the failure of the first node of the HA pair, wherein if the first node of the HA pair was utilizing a floating address, the second node of the HA pair registers the second node of the HA pair with the service provider interface by at least adding an address of the second node to the at least one route table corresponding to the service provider interface; and servicing requests received by the second node of the HA pair after performing the failover operation under the control of the second node of the HA pair.

2. The method of claim 1 wherein the first node of the HA pair has multiple network interfaces each having corresponding addresses and the first node of the HA pair is configured to utilize at least two subnets with the multiple network interfaces, and the second node of the HA pair has multiple network interfaces each having corresponding addresses and the second node of the HA pair is configured to utilize at least two subnets with the multiple network interfaces.

3. The method of claim 1 wherein the first node of the HA pair is in a first availability zone and the second node of the HA pair is in a second availability zone.

4. The method of claim 1 wherein the first node of the HA pair is in a first subnet having a first range of addresses, and the second node of the HA pair is in a second subnet having a second range of addresses.

5. The method of claim 1 wherein registering the first node of the HA pair with the service provider interface is performed by the first node of the HA pair.

6. The method of claim 1 wherein the service provider interface comprises an interface to access one or more services of a cloud service provider.

7. The method of claim 1 wherein the second node of the HA pair detects the failure of the first node of the HA pair.

8. A non-transitory computer-readable medium having stored thereon instructions that, when executed by one or more processors, cause the one or more processors to:

create a network interface using a private address within a subnet corresponding to the created network interface;

register a first node of the HA pair with a service provider interface, the first node to be an active data server of the HA pair and a second node of the HA pair to be a backup node of the HA pair, wherein registering the first node of the HA pair with the service provider interface comprises at least adding an address of the first node to at least one route table corresponding to the service provider interface;

service requests received by the first node of the HA pair by accessing the service provider interface using the at least one route table;

detect a failure of the first node of the HA pair;

register, with the second node of the HA pair and in response to the detection of the failure of the first node of the HA pair, the second node of the HA pair with the service provider interface by at least adding an address of the second node to the at least one route table corresponding to the service provider interface; and service requests received by the second node of the HA pair by accessing the service provider interface using the at least one route table.

9. The non-transitory computer-readable medium of claim 8 wherein the first node of the HA pair has multiple network interfaces each having corresponding addresses and the first node of the HA pair is configured to utilize at least two subnets with the multiple network interfaces, and the second node of the HA pair has multiple network interfaces each having corresponding addresses and the second node of the HA pair is configured to utilize at least two subnets with the multiple network interfaces.

10. The non-transitory computer-readable medium of claim 8 wherein the first node of the HA pair is in a first subnet having a first range of addresses, and the second node of the HA pair is in a second subnet having a second range of addresses.

11. The non-transitory computer-readable medium of claim 8 wherein the first node of the HA pair is in a first availability zone and the second node of the HA pair is in a second availability zone.

12. The non-transitory computer-readable medium of claim 8 wherein registering the first node of the HA pair with the service provider interface is performed by the first node of the HA pair.

13. The non-transitory computer-readable medium of claim 8 wherein the service provider interface comprises an interface to access one or more services of a cloud service provider.

14. The non-transitory computer-readable medium of claim 8 wherein the second node of the HA pair detects the failure of the first node of the HA pair.

15. A system comprising:

a plurality of hardware processors configured to provide a cloud-based computing environment to provide network address migration utilizing a destination compute instance of a high availability (HA) pair to update a network configuration in a cloud computing environment, wherein the HA pair communicates with the cloud computing environment via, the hardware processors of the cloud-based computing environment configured to:

create a network interface either using a private address within a subnet corresponding to the created network interface or using a floating address outside of the subnet corresponding to the created network interface;

register a first node of the HA pair with a service provider interface, the first node to be an active data server of the HA pair and a second node of the HA pair to be a backup node of the HA pair, wherein registering the first node of the HA pair with the service provider interface comprises utilizing either the private address or the floating address, wherein registration comprises at least adding the floating address of the first node to at least one route table corresponding to the service provider interface if the created network interface utilizes the floating address;

service requests received by the first node of the HA pair by accessing the service provider interface using the created network interface;

detect a failure of the first node of the HA pair;

determine, with the second node of the HA pair, whether the created network interface utilizes the private address or the floating address;

perform a failover operation under control of the second node of the HA pair in response to detecting the failure of the first node of the HA pair, wherein if the first node of the HA pair was utilizing a floating address, the second node of the HA pair registers the second node of the HA pair with the service provider interface by at least adding an address of the second node to the at least one route table corresponding to the service provider interface; and service requests received by the second node of the HA pair after performing the failover operation under the control of the second node of the HA pair.

16. The system of claim 15 wherein the first node of the HA pair has multiple network interfaces each having corresponding addresses and the first node of the HA pair is configured to utilize at least two subnets with the multiple network interfaces, and the second node of the HA pair has multiple network interfaces each having corresponding addresses and the second node of the HA pair is configured to utilize at least two subnets with the multiple network interfaces.

17. The system of claim 15 wherein the first node of the HA pair is in a first subnet having a first range of addresses, and the second node of the HA pair is in a second subnet having a second range of addresses.

18. The system of claim 15 wherein the first node of the HA pair is in a first availability zone and the second node of the HA pair is in a second availability zone.

19. The system of claim 15 wherein registering the first node of the HA pair with the service provider interface is performed by the first node of the HA pair.

20. The system of claim 15 wherein the second node of the HA pair detects the failure of the first node of the HA pair.

* * * * *